(12) United States Patent
Hao

(10) Patent No.: US 12,542,655 B2
(45) Date of Patent: Feb. 3, 2026

(54) TERMINAL AND AUTHENTICATION METHOD

(71) Applicant: NEC Corporation, Tokyo (JP)

(72) Inventor: Jia Hao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 134 days.

(21) Appl. No.: 18/373,728

(22) Filed: Sep. 27, 2023

(65) Prior Publication Data

US 2024/0113864 A1   Apr. 4, 2024

(30) Foreign Application Priority Data

Oct. 3, 2022 (JP) ................. 2022-159320

(51) Int. Cl.
| | |
|---|---|
| *H04L 9/08* | (2006.01) |
| *G06Q 20/36* | (2012.01) |
| *G06Q 20/38* | (2012.01) |
| *G06Q 20/40* | (2012.01) |
| *G06Q 40/03* | (2023.01) |
| *H04L 9/32* | (2006.01) |

(52) U.S. Cl.
CPC ........... *H04L 9/0825* (2013.01); *G06Q 20/36* (2013.01); *G06Q 20/3823* (2013.01); *G06Q 20/401* (2013.01); *G06Q 40/03* (2023.01); *H04L 9/3247* (2013.01); *G06Q 2220/00* (2013.01)

(58) Field of Classification Search
CPC ....... H04L 9/0825; H04L 9/3247; H04L 9/50; G06Q 20/36; G06Q 20/3823; G06Q 20/401; G06Q 40/03; G06Q 2220/00; G06Q 20/0652; G06Q 20/1085; G06Q 20/3825; G06Q 20/409; G06F 21/31
See application file for complete search history.

(56) References Cited

U.S. PATENT DOCUMENTS

| | | | | |
|---|---|---|---|---|
| 2009/0300363 | A1* | 12/2009 | Hamalainen | .......... G06F 21/725 463/25 |
| 2017/0353449 | A1* | 12/2017 | Ohbitsu | ................... G06F 21/31 |
| 2020/0372496 | A1* | 11/2020 | Hochberg | .......... G06Q 20/3674 |
| 2022/0294642 | A1* | 9/2022 | Moriya | ................. H04L 9/3252 |
| 2024/0386432 | A1* | 11/2024 | Lee | ........................ G06Q 40/03 |

FOREIGN PATENT DOCUMENTS

JP         2018-028745 A      2/2018

* cited by examiner

*Primary Examiner* — Brian Whipple
(74) *Attorney, Agent, or Firm* — Sughrue Mion, PLLC

(57) ABSTRACT

A terminal according to one aspect includes: at least one memory configured to store an instruction; and at least one processor configured to perform the instruction, wherein the processor performs the instruction, and thus provides, to another terminal, an authentication request related to data being an authentication target, authentication information about an own terminal, and credit information about the own terminal, acquires, from the another terminal, an authentication result of the another terminal for the authentication request, and reclaims the credit information from the another terminal or an authentication server after the another terminal accesses the authentication server and thus validity of the authentication information is authenticated.

15 Claims, 14 Drawing Sheets

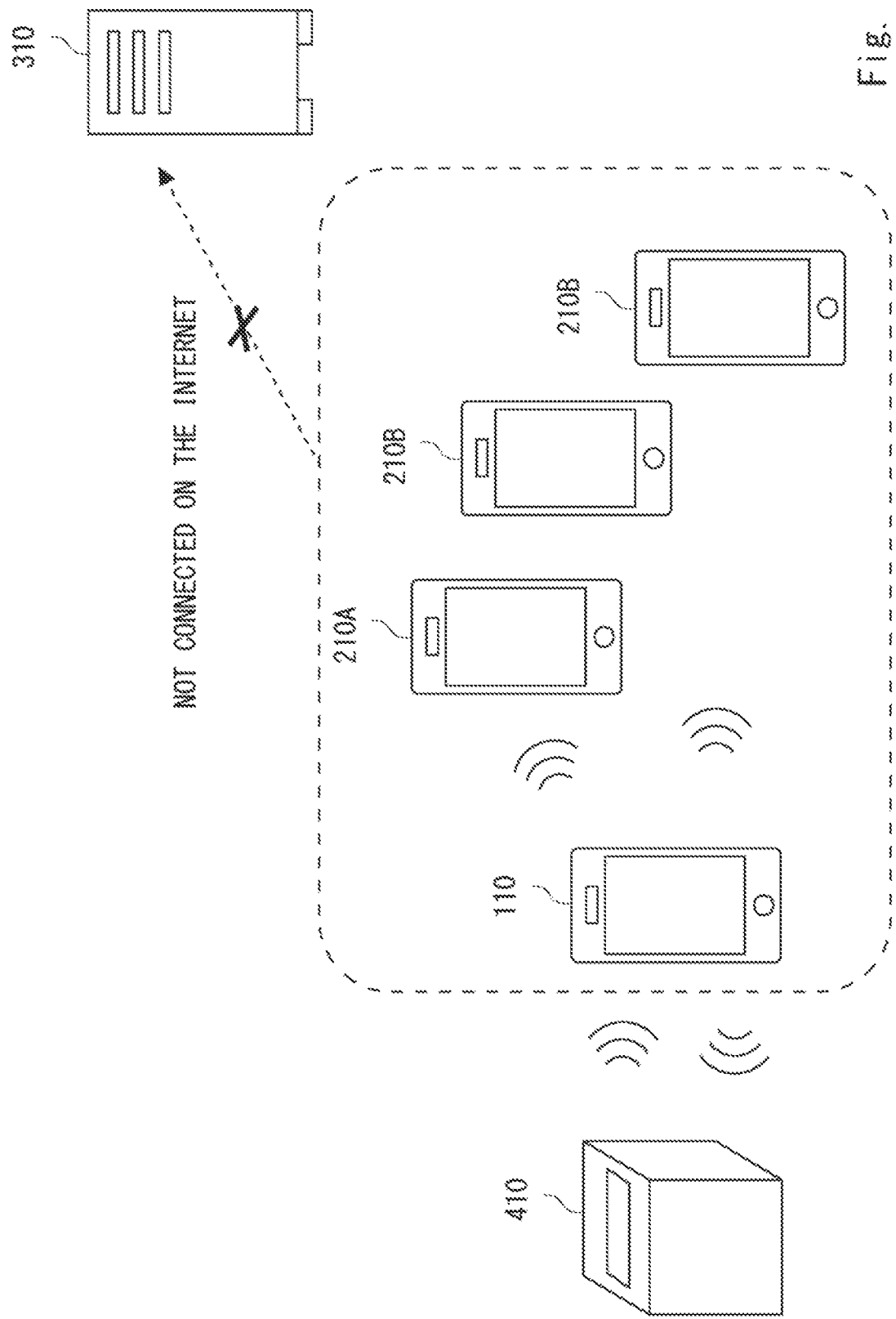

TERMINAL AND AUTHENTICATION METHOD

INCORPORATION BY REFERENCE

This application is based upon and claims the benefit of priority from Japanese patent application No. 2022-159320, filed on Oct. 3, 2022, the disclosure of which is incorporated herein in its entirety by reference.

TECHNICAL FIELD

The present disclosure relates to a terminal and an authentication system.

BACKGROUND ART

Various techniques for performing authentication processing between a server and a terminal are disclosed. For example, Japanese Unexamined Patent Application Publication No. 2018-028745 describes that an authentication server issues an advertisement tag, a signature, and a distribution control program from first to last. The technique has an object to provide security to a user terminal even in a state where many servers are involved in advertisement distribution.

SUMMARY

There is a conceivable case where, even when a terminal tries to access a server for authentication processing, the terminal cannot access the server due to a problem of the terminal or a network. In this case, the terminal needs to perform the authentication processing with the server via another terminal. Japanese Unexamined Patent Application Publication No. 2018-028745 do not disclose such a technique.

One example of an object to be achieved by example embodiments of the present disclosure is to provide a terminal and an authentication system that are able to perform authentication processing by a plurality of terminals in cooperation with each other. It should be noted that this object is merely one of a plurality of objects to be achieved by the plurality of example embodiments disclosed herein. The other objects or problems and a new characteristic will become apparent from the description of the present specification and the accompanying drawings.

A terminal according to one aspect includes at least one memory configured to store an instruction, and at least one processor configured to perform the instruction. The processor performs the instruction, and thus provides, to another terminal, an authentication request related to data being an authentication target, authentication information about an own terminal, and credit information about the own terminal, acquires, from the another terminal, an authentication result of the another terminal for the authentication request, and reclaims the credit information from the another terminal or an authentication server after the another terminal accesses the authentication server and thus validity of the authentication information is authenticated.

A terminal according to another aspect includes at least one memory configured to store an instruction, and at least one processor configured to perform the instruction. The processor performs the instruction, and thus acquires, from another terminal, an authentication request related to data being an authentication target, authentication information about the another terminal, and credit information about the another terminal, generates an authentication result for the authentication request, provides the authentication result to the another terminal, confirms validity of the authentication information by accessing an authentication server, and returns the credit information to the another terminal when validity of the authentication information is confirmed.

An authentication system according to one aspect includes a first terminal, and a second terminal, and the first terminal includes at least one first memory configured to store a first instruction, and at least one first processor configured to perform the first instruction. The first processor performs the first instruction, and thus provides, to the second terminal, an authentication request related to data being an authentication target, authentication information about the first terminal, and credit information about the first terminal. The second terminal includes at least one second memory configured to store a second instruction, and at least one second processor configured to perform the second instruction. The second processor performs the second instruction, and thus generates an authentication result for the authentication request, provides the authentication result to the first terminal, confirms validity of the authentication information by accessing an authentication server, and returns the credit information to the first terminal when validity of the authentication information is confirmed.

BRIEF DESCRIPTION OF DRAWINGS

The above and other aspects, features and advantages of the present disclosure will become more apparent from the following description of certain exemplary embodiments when taken in conjunction with the accompanying drawings, in which:

FIG. 7 is a schematic diagram illustrating one example of the authentication system according to the present disclosure;

EXAMPLE EMBODIMENT

Each example embodiment will be described below with reference to the drawings. Note that, for clarification of the description, the description and the drawings below are appropriately omitted and simplified. Further, in the present disclosure, when "at least any of" a plurality of items is defined, the definition may indicate any one item, or may indicate any of the plurality of items (including all of the items) unless otherwise specified. Further, it is needless to say that a whole or any part of a configuration described in each example embodiment can be appropriately applied to a device and the like described in another example embodiment. Similarly, the drawings referred for description in each example embodiment can also be applied to another example embodiment.

First Example Embodiment

Figure 1:
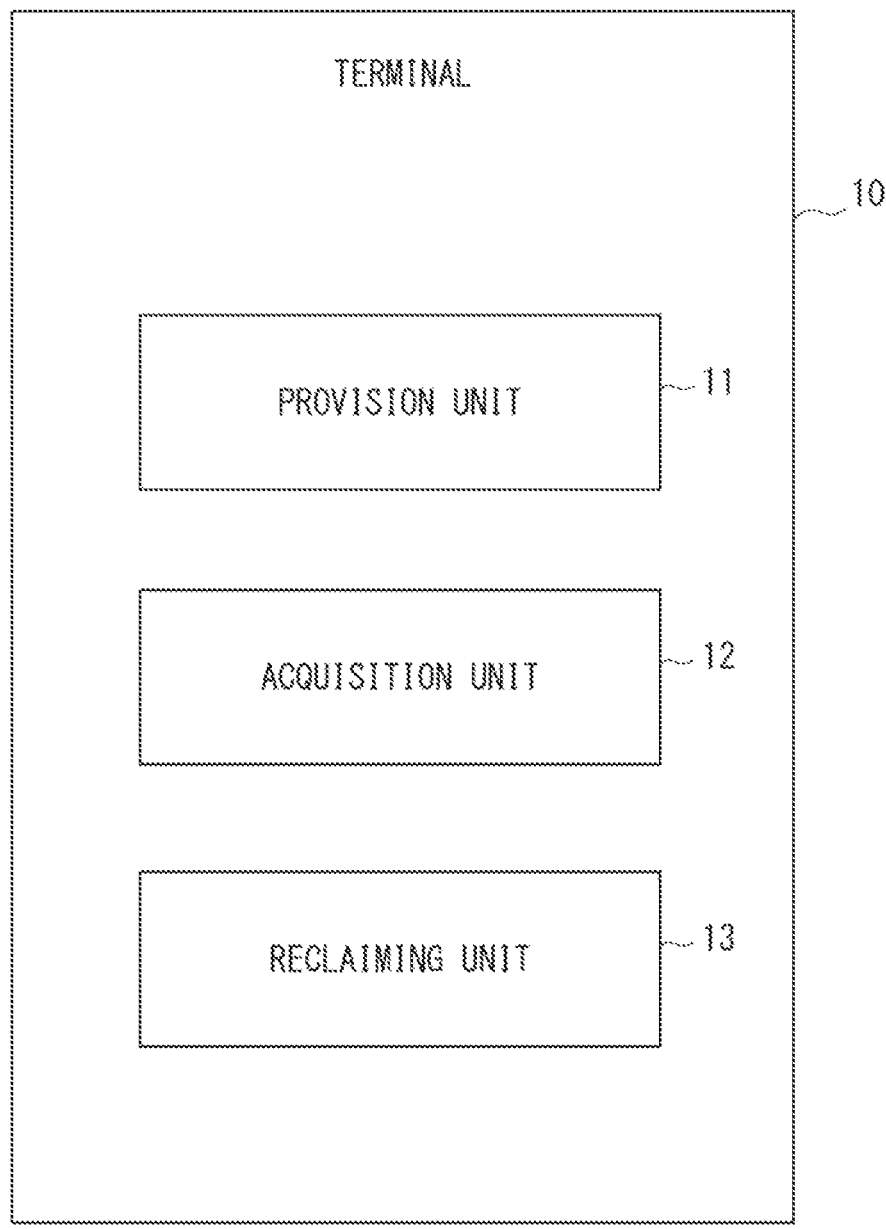
FIG. 1 is a block diagram illustrating one example of a terminal according to the present disclosure.

FIG. 1 is a block diagram illustrating one example of a terminal. A terminal 10 includes a provision unit 11, an acquisition unit 12, and a reclaiming unit 13. The terminal 10 is a portable terminal such as a smartphone, and a computer of any kind such as a personal computer (PC). Each unit (each means) of the terminal 10 is controlled by a control unit (controller) that is not illustrated. Hereinafter, each unit of the terminal 10 will be described. Note that a configuration and processing described below are exemplifications, which are not limited thereto.

The provision unit 11 provides, to another terminal, an authentication request related to data being an authentication target, authentication information about the terminal 10, and credit information about the terminal 10. The authentication information is any information needed for the another terminal to authenticate the terminal 10. Further, the credit information is information being security entrusted to the another terminal until authentication processing ends. The credit information may include, for example, history information about the authentication processing up to the present.

The provision unit 11 may include, for example, an interface (wireless communication unit) of wireless communication. The interface of wireless communication may be an interface of wireless communication of any kind between a base station and a portable terminal, such as 5th generation (5G), long term evolution (LTE), and Beyond 5G. Further, as another example, the interface of wireless communication may be an interface of wireless communication that performs short-range wireless communication with a terminal or a device located near the terminal 10, such as a wireless local area network (LAN), Bluetooth (registered trademark), infrared communication, and near field communication (NFC). Note that Bluetooth may also include an expansion technique of Bluetooth such as Bluetooth low energy (BLE). A specific example of wireless LAN is, for example, WiFi (registered trademark). When the provision unit 11 performs short-range wireless communication, the provision unit 11 can directly transmit data to another terminal without the data passing through a base station and the like. The another terminal receives the authentication request by using an interface of wireless communication of the another terminal. However, the terminal 10 may be connected to another terminal via a plurality of connection apparatuses by mesh network connection, and the provision unit 11 may provide the above-described information to the another terminal via a mesh network. Further, the provision unit 11 may be an interface of wired communication.

As another example, the provision unit 11 may include a display unit of data. In this case, the provision unit 11 being the display unit processes, by using software, data in such a way that the data can be acquired by another terminal, and then displays the data. For example, the provision unit 11 may display data by a code in any form such as a one-dimensional code or a two-dimensional code. A QR code (registered trademark) being a two-dimensional code is taken as an example of a code to be used, but the example of the code is not limited to this. Another terminal acquires an authentication request by acquiring an image displayed on the provision unit 11 by, for example, a camera included in the another terminal.

The another terminal performs processing for the acquired authentication request, and provides an authentication result being a result of the processing to the terminal 10. At this time, the terminal 10 and the another terminal are in a state of not being connected to an authentication server on the Internet, for example.

The acquisition unit 12 acquires, from the another terminal, the authentication result of the another terminal for the authentication request. The acquisition unit 12 may be, for example, an interface (wireless communication unit) of wireless communication. The interface of wireless communication may be an interface of wireless communication of any kind between a base station and a portable terminal, such as 5G, LTE, and Beyond 5G, and may be an interface of wireless communication that performs short-range wireless communication such as a wireless LAN (for example, WiFi), Bluetooth, and infrared communication. When the acquisition unit 12 performs short-range wireless communication, the acquisition unit 12 can directly receive an authentication result from another terminal without the authentication result passing through a base station and the like. However, the acquisition unit 12 may receive an authentication result from another terminal via a plurality of connection apparatuses by mesh network connection. Further, the acquisition unit 12 may be an interface of wired communication. When the acquisition unit 12 is an interface of wireless or wired communication, the provision unit 11 and the acquisition unit 12 may be formed of the same interface.

As another example, the acquisition unit 12 may be a camera. In this case, a display unit of another terminal displays data in a form in which the terminal 10 can acquire data about a displayed authentication result. The acquisition unit 12 captures the displayed data, and thus acquires an encoded authentication result.

The reclaiming unit 13 reclaims credit information from the another terminal or the authentication server after the another terminal accesses the authentication server and thus validity of the authentication information is authenticated. When the credit information is reclaimed from the authentication server, the credit information is transmitted from the another terminal to the authentication server, the credit information is transmitted from the authentication server to the terminal 10, and thus the terminal 10 reclaims the credit information.

The reclaiming unit 13 may be, for example, an interface of wireless communication that performs short-range wireless communication, or a camera when the credit information is reclaimed from the another terminal. A method for reclaiming the credit information from the another terminal by the reclaiming unit 13 is similar to that of the acquisition unit 12 described above. Further, the reclaiming unit 13 may be, for example, an interface of wireless communication of any kind between a base station and a portable terminal when the credit information is reclaimed from the authentication server. The acquisition unit 12 and the reclaiming unit 13 may be formed of the same interface.

Figure 2:
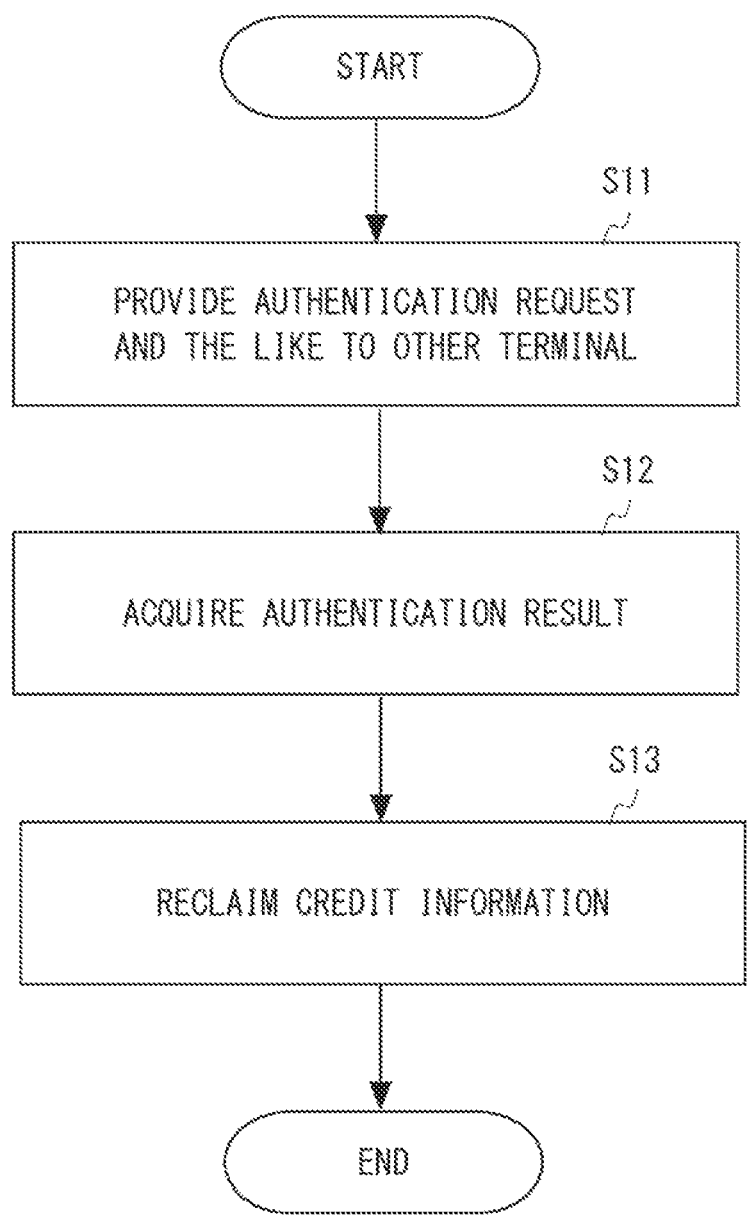
FIG. 2 is a flowchart illustrating one example of representative processing of the terminal according to the present disclosure.

FIG. 2 is a flowchart illustrating one example of representative processing of the terminal 10, and the processing of the terminal 10 is described with the flowchart. Note that details of each processing are as described above.

First, the provision unit 11 of the terminal 10 provides, to another terminal, an authentication request related to data being an authentication target, authentication information about the terminal 10, and credit information about the terminal 10 (step S11: provision step). Next, the acquisition unit 12 acquires, from the another terminal, an authentication result of the another terminal for the authentication request (step S12: acquisition step). The reclaiming unit 13 reclaims the credit information from the another terminal or an authentication server after the another terminal accesses the authentication server and thus validity of the authentication information is authenticated (step S13: reclaiming step).

In this way, in the authentication processing, another terminal provides an authentication result to the terminal 10, whereas the terminal 10 reclaims credit information from the another terminal or an authentication server when validity of authentication information is authenticated by using the authentication server. After the reclaiming, the terminal 10 can perform similar authentication request processing on the another terminal again by using the reclaimed credit information. In other words, by using the credit information as security, the terminal 10 can complete the authentication processing in cooperation with the another terminal even when the terminal 10 cannot be connected to the authentication server during execution of the authentication processing.

Second Example Embodiment

Figure 3:
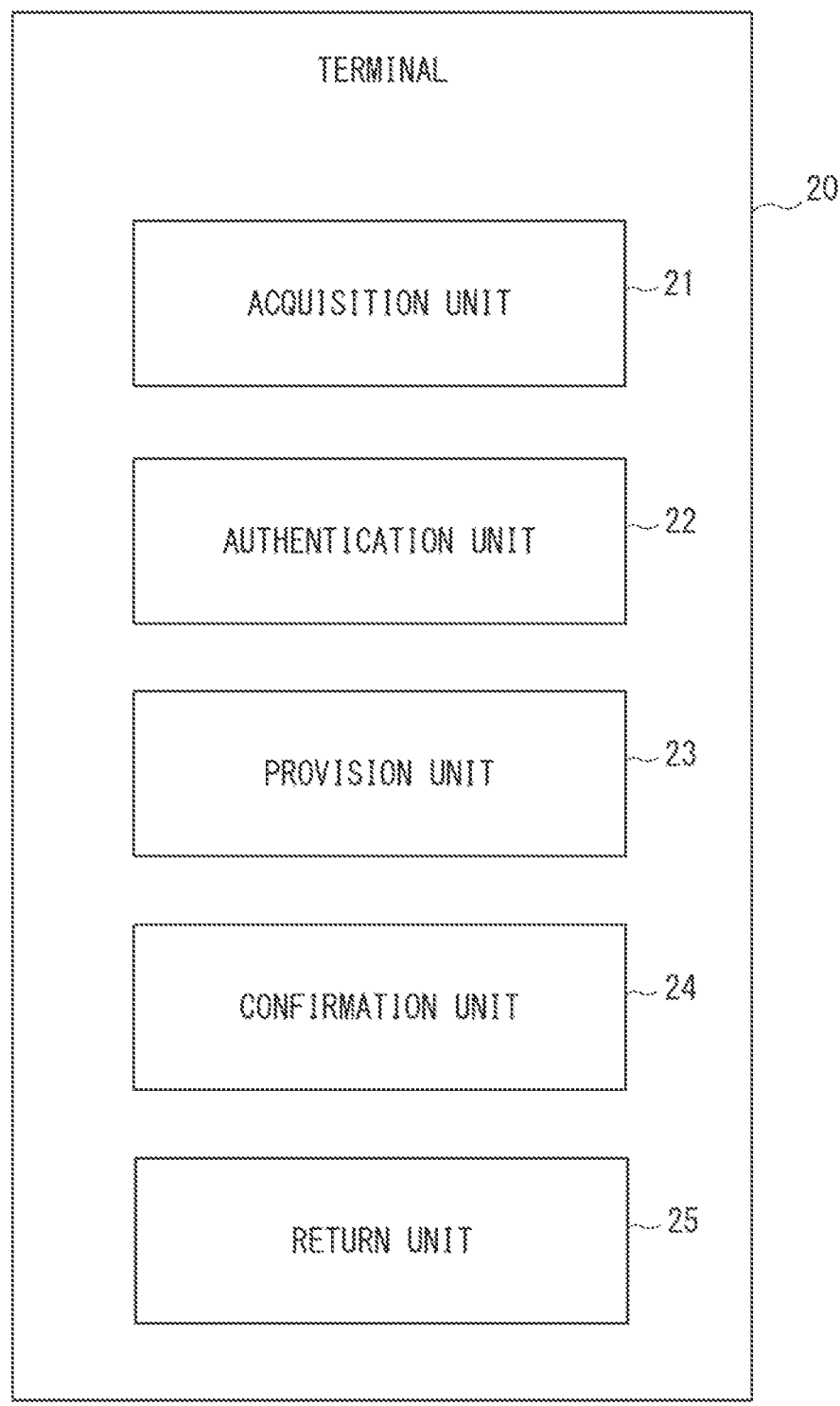
FIG. 3 is a block diagram illustrating one example of the terminal according to the present disclosure.

FIG. 3 is a block diagram illustrating a different example of a terminal. A terminal 20 includes an acquisition unit 21, an authentication unit 22, a provision unit 23, a confirmation unit 24, and a return unit 25. The terminal 20 is a portable terminal such as a smartphone, and a computer of any kind such as a PC. Each unit (each means) of the terminal 20 is controlled by a control unit (controller) that is not illustrated. Hereinafter, each unit of the terminal 20 will be described. Note that a configuration and processing described below are exemplifications, which are not limited thereto.

The acquisition unit 21 acquires, from another terminal, an authentication request related to data being an authentication target, authentication information about the another terminal, and credit information about the another terminal. The acquisition unit 21 may directly acquire data from the another terminal, or may acquire the data via still another terminal or a device. In the latter example, a case of connection with another terminal by mesh network connection is assumed.

The acquisition unit 21 may be, for example, an interface of wireless or wired communication, or a camera. In this way, the acquisition unit 21 has a configuration similar to that of the acquisition unit 12 according to the first example embodiment. Detailed description of the acquisition unit 21 is similar to that of the acquisition unit 12, and is thus omitted.

The authentication unit 22 authenticates the authentication request acquired by the acquisition unit 21, and generates an authentication result. A specific processing example of the authentication unit 22 will be described in a fourth example embodiment.

The provision unit 23 provides the authentication result generated by the authentication unit 22 to the another terminal. The provision unit 23 may include an interface of wireless or wired communication, and may include a display unit of data. In this way, the provision unit 23 has a configuration similar to that of the provision unit 11 according to the first example embodiment. Detailed description of the provision unit 23 is similar to that of the provision unit 11, and is thus omitted.

The confirmation unit 24 accesses the authentication server, and thus confirms validity of the authentication information acquired by the acquisition unit 21. For example, the confirmation unit 24 may confirm validity of the authentication information by transmitting an authentication request including the authentication information to the authentication server, causing the authentication server to perform the authentication processing, and acquiring a result of the authentication processing. As another example, the confirmation unit 24 itself may confirm whether the acquired authentication information is valid by referring to a list of pieces of valid or invalid authentication information stored in the authentication server and the acquired authentication information.

The return unit 25 returns the credit information acquired by the acquisition unit 21 to the another terminal when the validity of the authentication information is confirmed by the confirmation unit 24. The return unit 25 may directly return the credit information to the another terminal, or may return the credit information via still another terminal or a device. As the latter example, the credit information is returned to the another terminal via mesh network connection, or the credit information is returned via the authentication server.

The return unit 25 may include an interface of wireless or wired communication, and may include a display unit of data. In this way, the return unit 25 may have a configuration similar to that of the provision unit 23.

Figure 4:
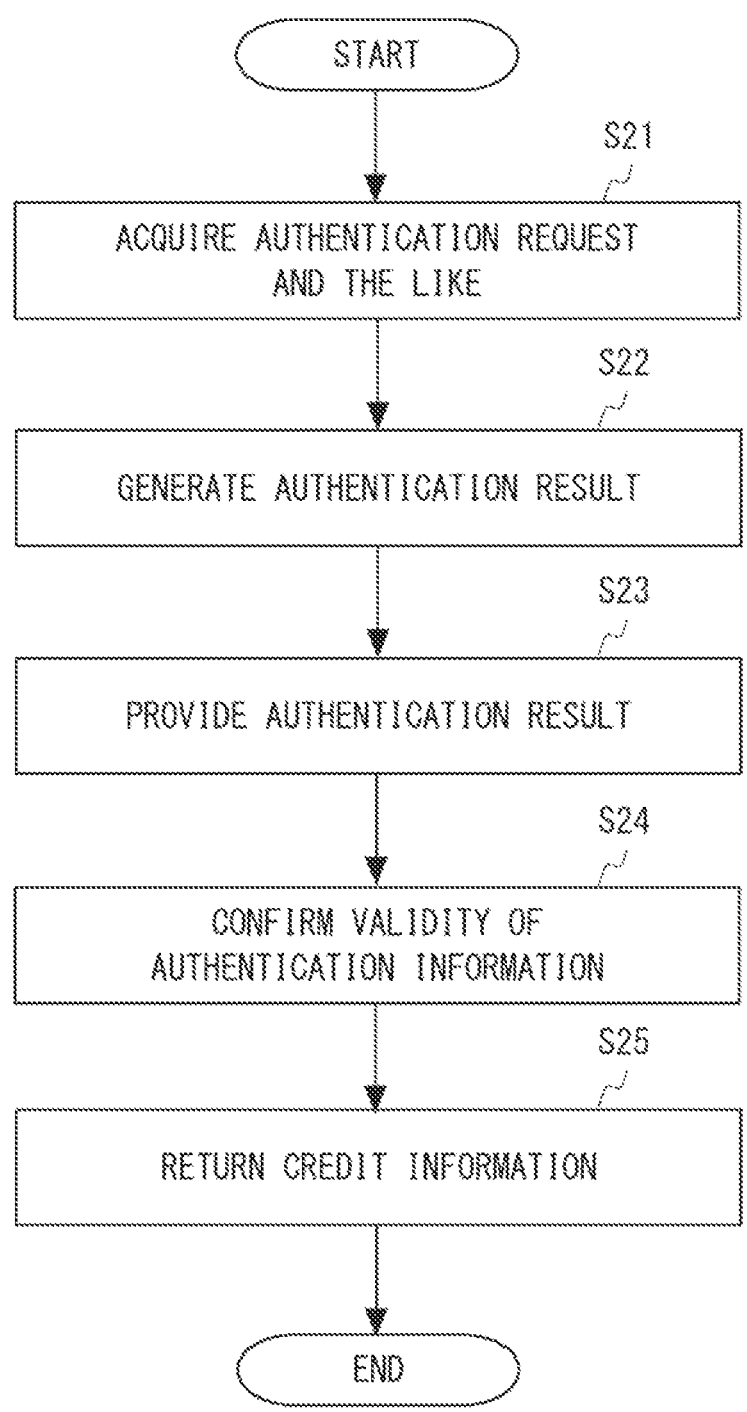
FIG. 4 is a flowchart illustrating one example of representative processing of the terminal according to the present disclosure.

FIG. 4 is a flowchart illustrating one example of representative processing of the terminal 20, and the processing of the terminal 20 is described with the flowchart. Note that details of each processing are as described above.

First, the acquisition unit 21 of the terminal 20 acquires, from another terminal, an authentication request related to data being an authentication target, authentication information about the another terminal, and credit information about the another terminal (step S21: acquisition step). Next, the authentication unit 22 generates an authentication result for the authentication request (step S22: generation step). The provision unit 23 provides the authentication result to the another terminal (step S23: provision step).

The confirmation unit 24 accesses the authentication server, and thus confirms validity of the authentication information (step S24: confirmation step). The return unit 25 returns the credit information to the another terminal when the validity of the authentication information is confirmed by the confirmation unit 24 (step S25: return step).

In this way, in the authentication processing, the terminal 20 provides an authentication result to another terminal, whereas the terminal 20 returns credit information to the another terminal when validity of authentication information is authenticated by using the authentication server. Subsequently, the another terminal can perform similar authentication request processing by using the reclaimed credit information. In other words, by using the credit information as security, the terminal 20 can complete the authentication processing in cooperation with the another terminal even when the another terminal cannot be connected to the authentication server during execution of the authentication processing.

Third Example Embodiment

Figure 5:
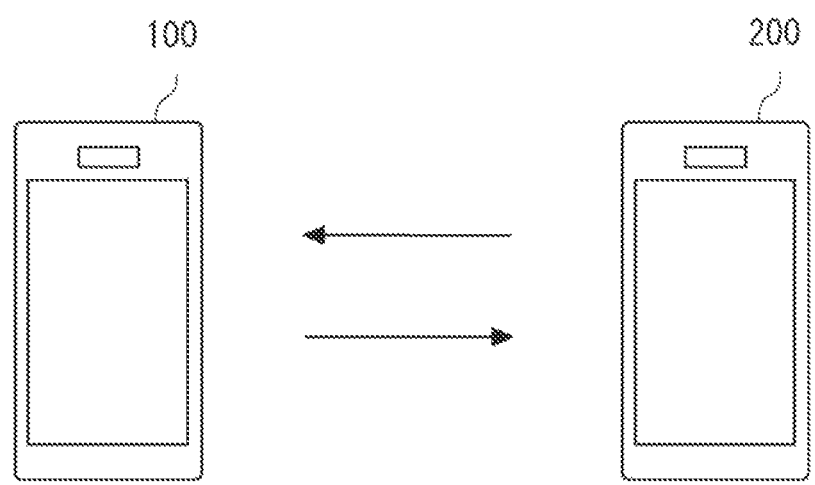
FIG. 5 is a schematic diagram illustrating one example of an authentication system according to the present disclosure.

FIG. 5 is a schematic diagram illustrating an example of an authentication system. An authentication system S1 includes terminals 100 and 200. However, the authentication system S1 may further include a terminal other than the terminals 100 and 200. Note that a configuration and processing described below are exemplifications, which are not limited thereto.

The terminals 100 and 200 each include a control unit (controller), and the control unit performs processing of each of the terminals. A specific example of a configuration of the terminal 100 is the terminal 10 illustrated in the first example embodiment, and a specific example of a configuration of the terminal 200 is the terminal 20 illustrated in the second example embodiment.

Figure 6:
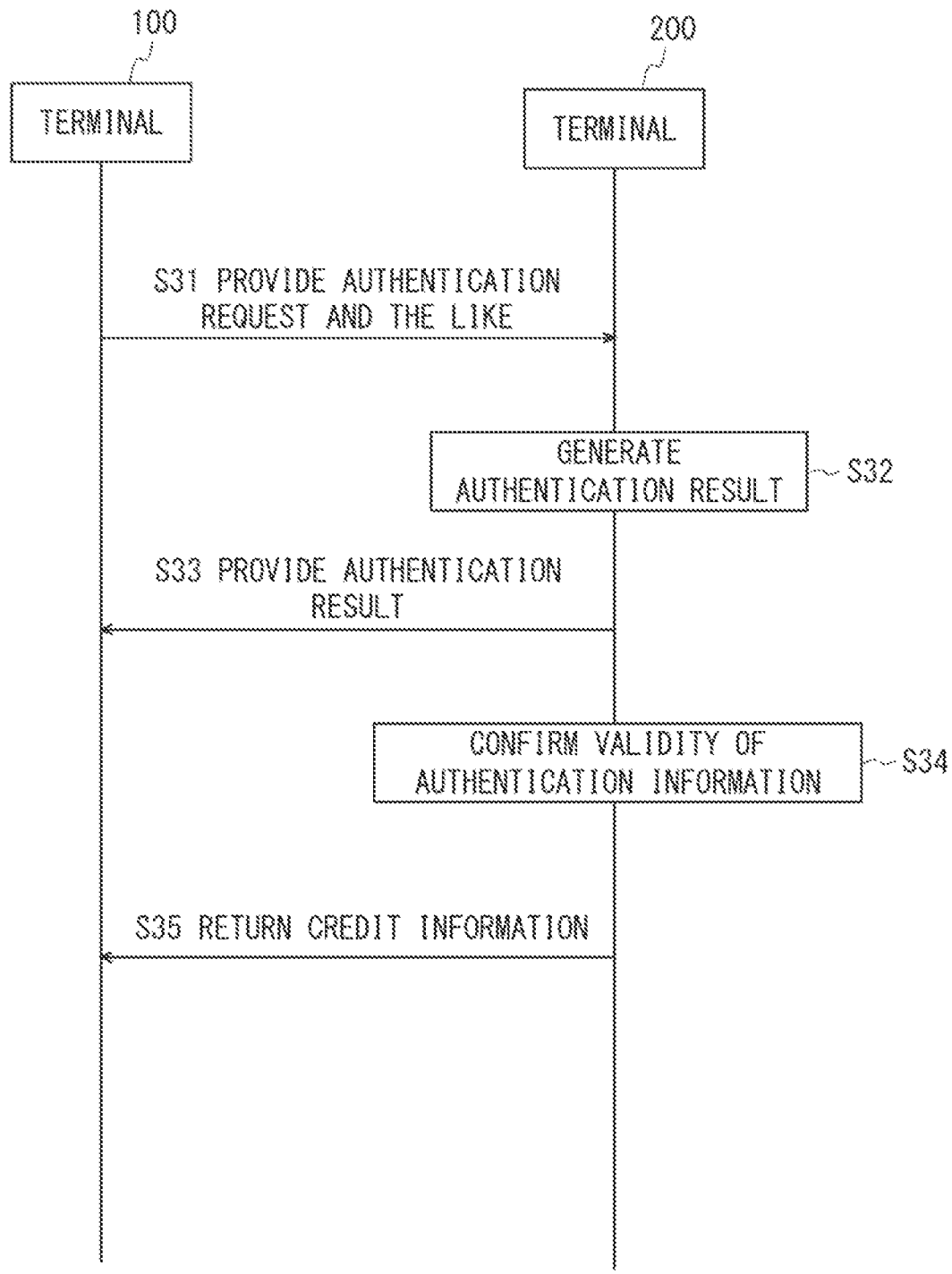
FIG. 6 is a sequence diagram illustrating a processing example of the authentication system according to the present disclosure.

FIG. 6 is a sequence diagram illustrating a processing example of the authentication system. Hereinafter, a processing example of the authentication system S1 will be described by using FIG. 6.

First, the terminal 100 provides, to the terminal 200, an authentication request related to data being an authentication target, authentication information about the terminal 100, and credit information about the terminal 100 (step S31). The terminal 200 generates an authentication result for the acquired authentication request (step S32). Then, the terminal 200 provides the generated authentication result to the terminal 100 (step S33).

Further, the terminal 200 accesses an authentication server 300, and thus confirms validity of the authentication information (step S34). The terminal 200 returns the credit information to the terminal 100 when the validity of the authentication information is confirmed (step S35). Note that FIG. 6 illustrates that the terminal 200 directly returns the credit information to the terminal 100, but the credit information may be returned to the terminal 100 via another terminal or a device such as an authentication server.

In this way, in the authentication processing, the terminal 200 provides an authentication result to the terminal 100, whereas the terminal 100 reclaims credit information when validity of authentication information is authenticated by using the authentication server. After the reclaiming, the terminal 100 can perform similar authentication request processing on the another terminal again by using the reclaimed credit information. In other words, by using the credit information as security, the terminal 100 and the terminal 200 can complete the authentication processing in cooperation even when the terminal 100 and the terminal 200 cannot be connected to the authentication server during execution of the authentication processing. In other words, the authentication system S1 forms a distributed system for the authentication processing.

Fourth Example Embodiment

Next, a fourth example embodiment will be described. In the fourth example embodiment, a specific example of the authentication system indicated in the third example embodiment is provided. Note that a configuration and processing described below are exemplifications, which are not limited thereto.

FIG. 7 is a schematic diagram illustrating an example of an authentication system. An authentication system S2 includes an authentication server 310 and an automatic teller machine (ATM) 410 in addition to terminals 110 and 210. The terminal 210 includes a plurality of terminals 210A, 210B, 210C, and . . . .

The authentication system S2 can perform authentication processing in cryptocurrency (digital currency) of any kind. Herein, a case is assumed where, when the terminal 110 performs, in the ATM 410, a transaction for exchanging cryptocurrency of a user (hereinafter described as a user A) of the terminal 110 with cash, authentication of the cryptocurrency possessed by the user A is needed. At this time, the terminal 110 and the terminal 210 cannot be connected on the Internet to the authentication server 310 that can perform the authentication, and thus the terminal 110 may not be able to acquire an authentication result from the authentication server 310. However, in the fourth example embodiment, as described below, the authentication processing can be completed.

The terminals 110 and 210 in the authentication system S2 correspond to the specific examples of the terminals 10 and 20 in the authentication system S1, respectively. The terminals 110 and 210 are assumed to be a smartphone herein. Hereinafter, details of each device in the authentication system S2 will be described.

Figure 8A:
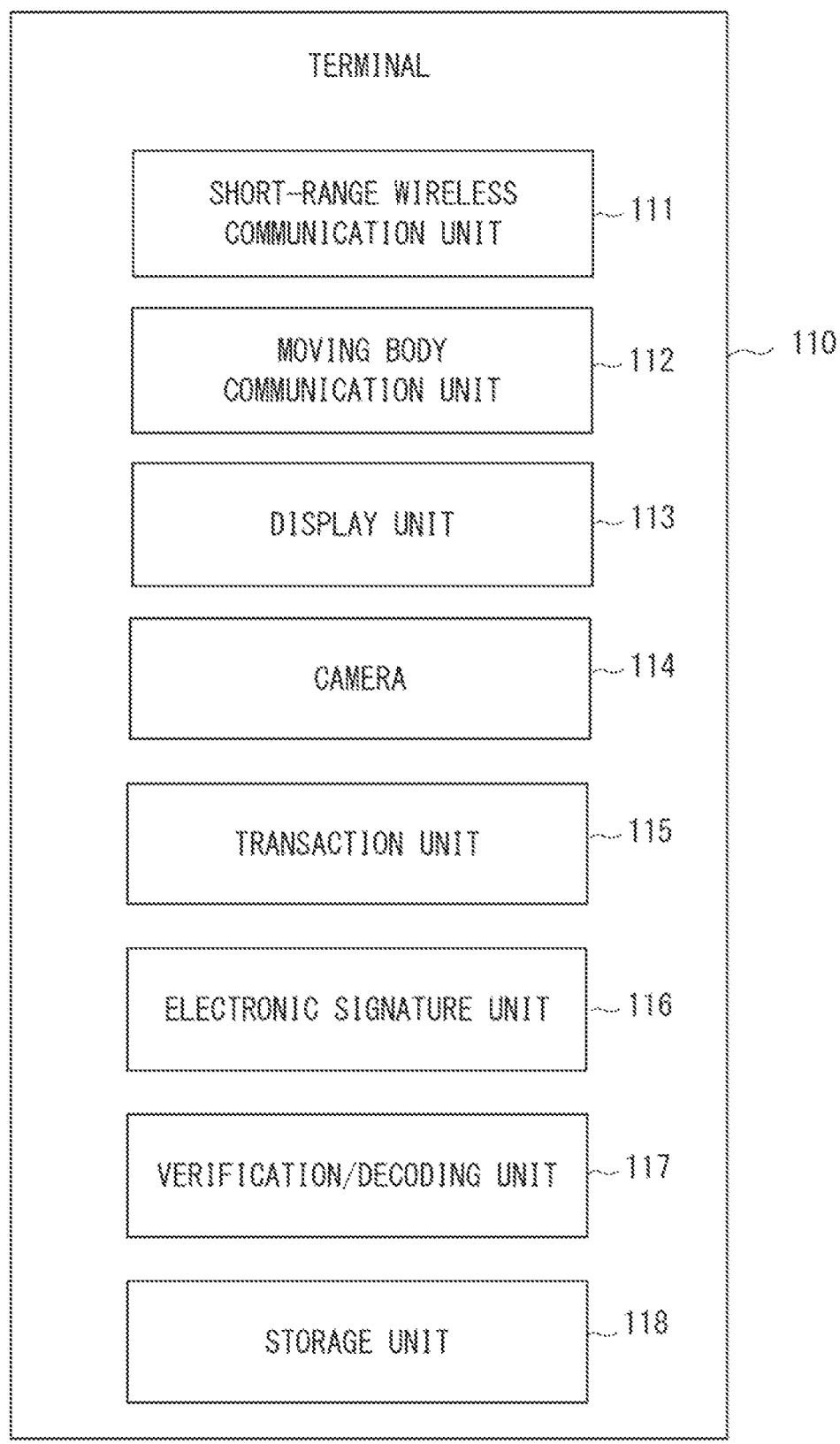
FIG. 8A is a block diagram illustrating one example of the terminal according to the present disclosure.
Figure 8B:
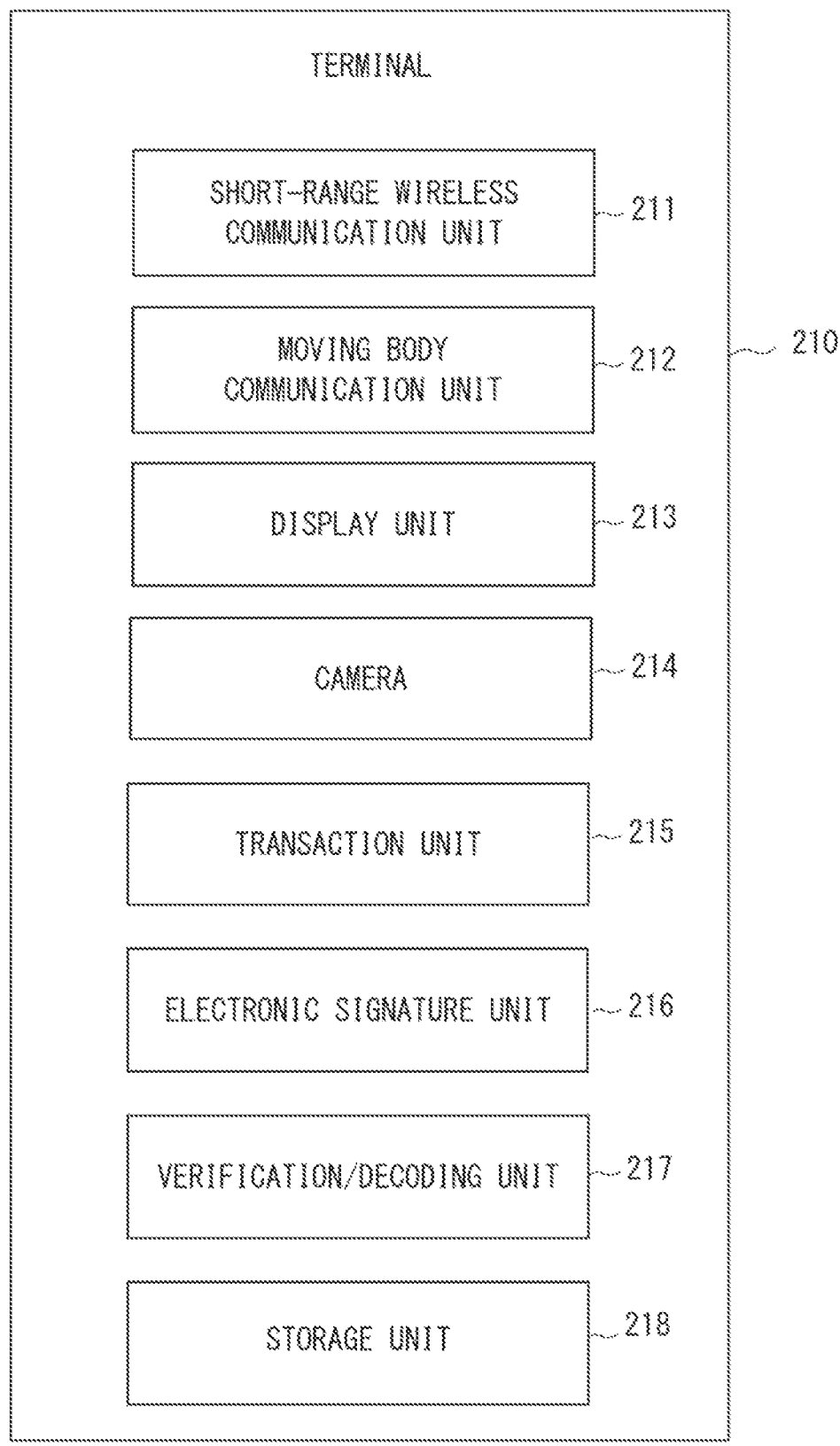
FIG. 8B is a block diagram illustrating one example of the terminal according to the present disclosure.

FIG. 8A is a block diagram illustrating one example of the terminal 110. The terminal 110 includes a short-range wireless communication unit 111, a moving body communication unit 112, a display unit 113, a camera 114, a transaction unit 115, an electronic signature unit 116, a verification/decoding unit 117, and a storage unit 118. Further, FIG. 8B is a block diagram illustrating one example of the terminal 210. The terminal 210 includes a short-range wireless communication unit 211, a moving body communication unit 212, a display unit 213, a camera 214, a transaction unit 215, an electronic signature unit 216, a verification/decoding unit 217, and a storage unit 218 that are components similar to those of the terminal 110. Hereinafter, each of the components of each of the terminals will be described.

The short-range wireless communication units 111 and 211 are an interface that performs terminal-to-terminal communication (device-to-device communication) between the terminal 110 and the terminal 210, and achieves transmission/reception of data between the terminals. In this example, the short-range wireless communication unit 111 uses WiFi as a short-range wireless communication technique between the terminals, but another short-range wireless communication technique such as Bluetooth may be used.

The moving body communication unit 112 is an interface that performs wireless communication between the terminal 110 and a base station, and the moving body communication unit 212 is an interface that performs wireless communication between the terminal 210 and a base station. However, in the fourth example embodiment, in an initial state, the moving body communication units 112 and 212 cannot be connected to the authentication server 310. Thus, as described below, the terminal 110 performs authentication processing off-line with one selected terminal 210. When the terminal 210 is subsequently connected to the authentication server 310, the terminal causes the authentication server 310 to confirm whether acquired authentication information is valid.

The display units 113 and 213 include an interface that displays an operation screen for each user, such as a display or a touch panel. Further, the display units 113 and 213 also have a function of converting desired data of each terminal into a QR code by software, and displaying the QR code. Examples of data converted into a QR code include data related to authentication processing of cryptocurrency.

The cameras 114 and 214 capture any video, and store information about the captured video in each of the terminals. For example, the camera 214 captures a QR code displayed by the display unit 113, and thus the terminal 210 can acquire data about the QR code. Similarly, the camera 114 captures a QR code displayed by the display unit 213, and thus the terminal 110 can acquire data about the QR code.

The transaction units 115 and 215 perform processing related to a transaction of cryptocurrency. For example, the transaction unit 115 can generate an authentication request to cause the authentication server 310 to perform authentication in order to acquire certification needed for a transaction of cryptocurrency. Further, the transaction unit 115 can perform processing needed for cryptocurrency by controlling the electronic signature unit 116, the verification/decoding unit 117, and the storage unit 118. The transaction unit 215 can also perform similar control on the electronic signature unit 216, the verification/decoding unit 217, and the storage unit 218. Furthermore, the transaction units 115 and 215 can also provide a time stamp to data being a processing target.

The electronic signature unit 116 provides, by using a secret key of the terminal 110, an electronic signature to data acquired by the terminal 110 from the terminal 210 or another device. Any method using a public key and a secret key can be used for generating an electronic signature. Similarly, the electronic signature unit 216 provides, by using a secret key of the terminal 210, an electronic signature to data acquired by the terminal 210 from the terminal 110 or another device. Further, as one example, the electronic signature unit 116 may generate an electronic signature by generating, by a secret key, an encoded characteristic (digest) of a document being a target to be provided to another terminal or a device.

The verification/decoding unit 117 performs any processing of verification or decoding on data acquired by the terminal 110 from the terminal 210 or another device. For example, when acquired data are provided with an electronic signature of the terminal 210, the verification/decoding unit 117 verifies, by using a public key of the terminal 210, whether the electronic signature is really provided by the terminal 210. For example, when an electronic signature is generated by encoding a characteristic of a document by the secret key of the terminal 210, the verification/decoding unit 117 can confirm presence or absence of tampering by extracting the characteristic of the document from the electronic signature by using the public key of the terminal 210, and comparing the characteristic with the document included in the acquired data. Further, when acquired data are encoded by a public key of the terminal 110, the verification/decoding unit 117 decodes the encoded data by using the secret key of the terminal 110.

Further, the verification/decoding unit 217 also performs processing similar to that of the verification/decoding unit 117. For example, when acquired data are provided with an electronic signature of the terminal 110, the verification/decoding unit 217 verifies, by using the public key of the terminal 110, whether the electronic signature is really provided by the terminal 110. Further, when acquired data are encoded by the public key of the terminal 210, the verification/decoding unit 217 can decode the encoded data by using the secret key of the terminal 210. Furthermore, the verification/decoding unit 217 can also encode data by using the public key of the terminal 210.

A wallet that stores data used for a transaction of cryptocurrency is present in the storage unit 118. Data used for a transaction of cryptocurrency include at least a public address being the public key of the terminal 110, and the secret key of the terminal 110 associated with the public address. The wallet is a mobile wallet in this example. However, when the terminal 110 is not a smartphone, the wallet may be a hot wallet such as a desktop wallet or a cold wallet of other kinds, for example. Cryptocurrency being a management target by the wallet is operated by any of a public type block chain and a consortium type block chain (federated block chain), for example. As a specific example of cryptocurrency operated by the public type block chain, Ethereum (registered trademark), Algo (registered trademark), and the like are associated. The electronic signature unit 116 and the verification/decoding unit 117 perform their own processing by using a secret key stored in the wallet. Similarly, the storage unit 218 also has a wallet that stores at least a public address being the public key of the terminal 210 and the secret key of the terminal 210 associated with the public address, and the electronic signature unit 216 and the verification/decoding unit 217 perform their own processing by using a secret key stored in the wallet.

Further, each of the terminals can also receive, by using the wallet, remuneration (commission related to authentication processing) for being involved in a transaction of cryptocurrency. Specifically, the terminal 210 acquires an authentication request of the terminal 110 related to authentication of cryptocurrency, and information about remuneration being set by the terminal 110 in relation to an authentication procedure. Subsequently, when the electronic signature unit 216 provides an electronic signature to the authentication request, a procedure of receiving at least a part of a remuneration amount presented from the terminal 110 is automatically performed by the wallet of the storage unit 218. In this example, cryptocurrency is Ethereum, and remuneration related to the authentication processing is GAS. However, a kind of remuneration is optional, and remuneration may be cash, a point, and the like.

Furthermore, credit information is stored in addition to GAS information in the wallet. As described above, the credit information is information being security entrusted to another terminal until authentication processing ends. The credit information includes history information about the authentication processing up to the present. Further, a credit token assigned to the user A is stored in the wallet.

Note that a correspondence between each unit of the terminal 10 and each unit of the terminal 110 is as follows. The provision unit 11 corresponds to the short-range wireless communication unit 111 or the display unit 113, the acquisition unit 12 corresponds to the short-range wireless communication unit 111 or the camera 114, and the reclaiming unit 13 corresponds to the moving body communication unit 112.

Further, a correspondence between each unit of the terminal 20 and each unit of the terminal 210 is as follows. The acquisition unit 21 corresponds to the short-range wireless communication unit 211 or the camera 214, the authentication unit 22 corresponds to the verification/decoding unit 217, the provision unit 23 corresponds to the short-range wireless communication unit 211 or the display unit 213, the confirmation unit 24 corresponds to the moving body communication unit 212, and the return unit 25 corresponds to the moving body communication unit 212, the short-range wireless communication unit 211, or the display unit 213.

Figure 9:
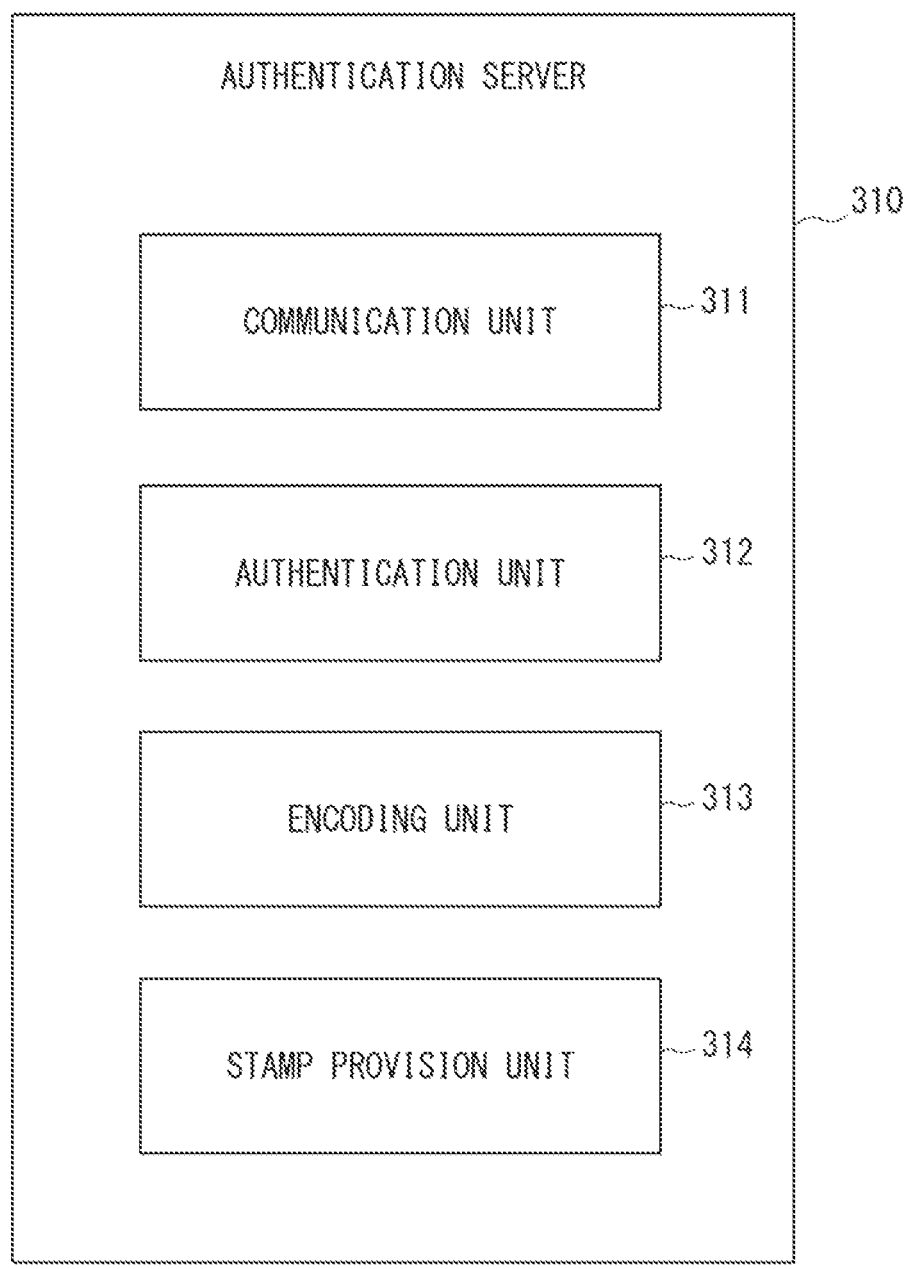
FIG. 9 is a block diagram illustrating one example of an authentication server according to the present disclosure.

FIG. 9 is a block diagram illustrating one example of the authentication server 310. The authentication server 310 includes a communication unit 311, an authentication unit 312, an encoding unit 313, and a stamp provision unit 314. Hereinafter, each of the components will be described.

The communication unit 311 is an interface that performs communication (transmission/reception of data) with an external device. In this example, the communication unit 311 is connected to the moving body communication unit 212 via the Internet.

The authentication unit 312 authenticates an authentication request acquired from the communication unit 311, and generates an authentication result. The authentication request is related to authentication of the terminal 110, and is transmitted from the terminal 210. The encoding unit 313 encodes the authentication result by using the public key of the terminal 210 in such a way that the authentication result cannot be read by a terminal other than the terminal 210. The stamp provision unit 314 suppresses tampering of information by providing a time stamp to the authentication result. The authentication result being encoded and provided with the time stamp in such a manner is transmitted from the communication unit 311 to the terminal 210. A technique of any known kind of a time stamp can be applied to the stamp provision unit 314.

Note that information about a public key certificate of a terminal such as a certificate revocation list (CRL) may be stored in a database (not illustrated) in the authentication server 310.

Figure 10:
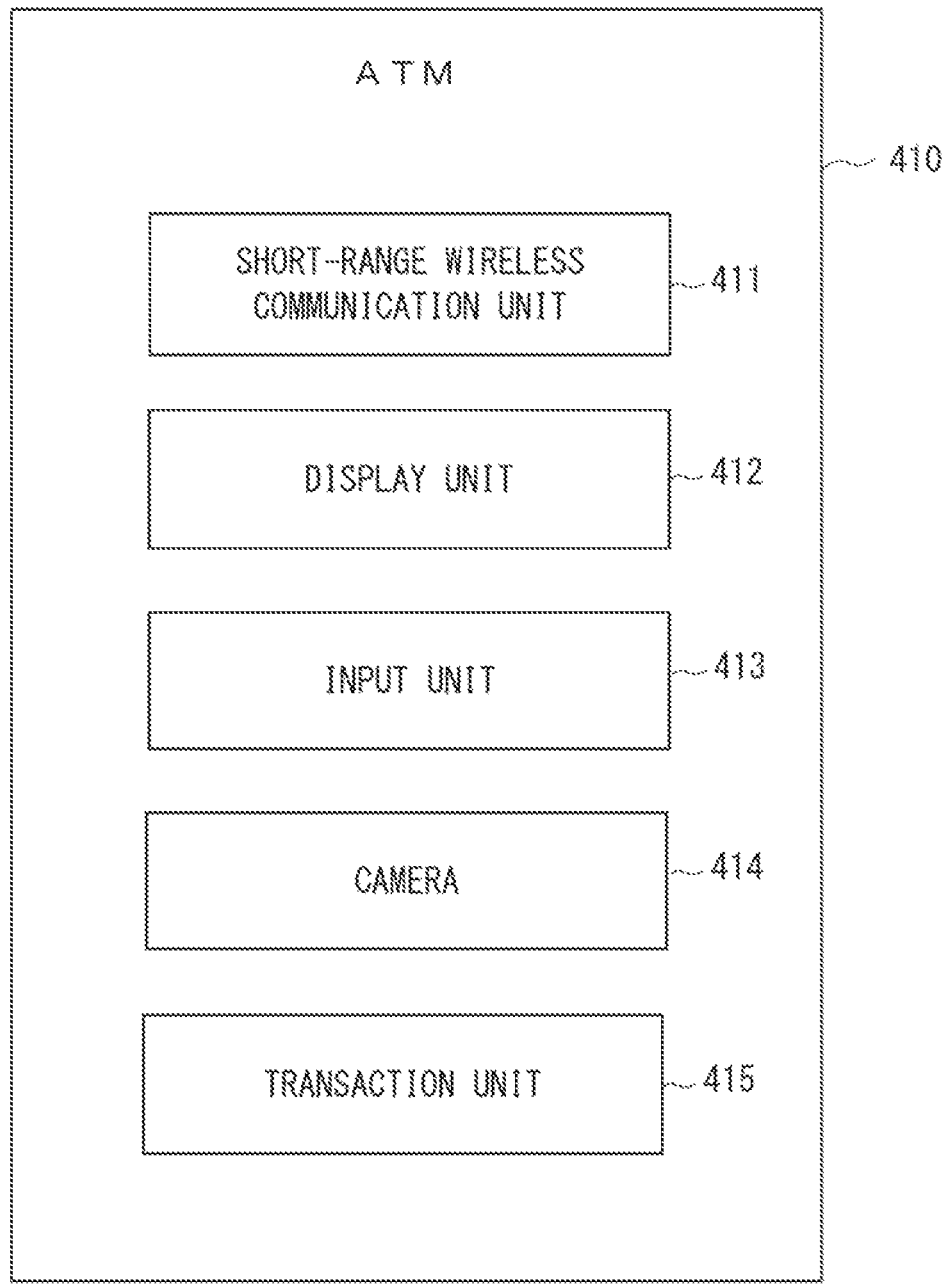
FIG. 10 is a block diagram illustrating one example of an ATM according to the present disclosure.

FIG. 10 is a block diagram illustrating one example of the ATM 410. The ATM 410 is a transaction device of cryptocurrency, and includes a short-range wireless communication unit 411, a display unit 412, an input unit 413, a camera 414, and a transaction unit 415. Hereinafter, each of the components will be described.

The short-range wireless communication unit 411 is an interface that performs terminal-to-terminal communication with another terminal or a device (for example, the terminal 110) located near the ATM 410. In this example, the short-range wireless communication unit 411 uses WiFi as a short-range wireless communication technique, but another short-range wireless communication technique such as Bluetooth may be used.

The display unit 412 includes an interface that displays information for a user of the ATM 410, such as a display or a touch panel. The input unit 413 is an input interface such as a button and a touch panel being used by a user of the ATM 410. Note that the display unit 412 and the input unit 413 may be integrated as a touch panel.

The camera 414 captures any video, and stores information about the captured video in the ATM 410. For example, the camera 414 captures a QR code displayed by the display unit 113, and thus the ATM 410 can acquire data about the QR code.

The transaction unit 415 performs transaction processing related to cryptocurrency, based on the information being input by the input unit 413 or the information being acquired by the camera 414. In an example indicated below, the transaction unit 415 performs transaction processing of exchanging cryptocurrency of the user A with cash.

Figure 11A:
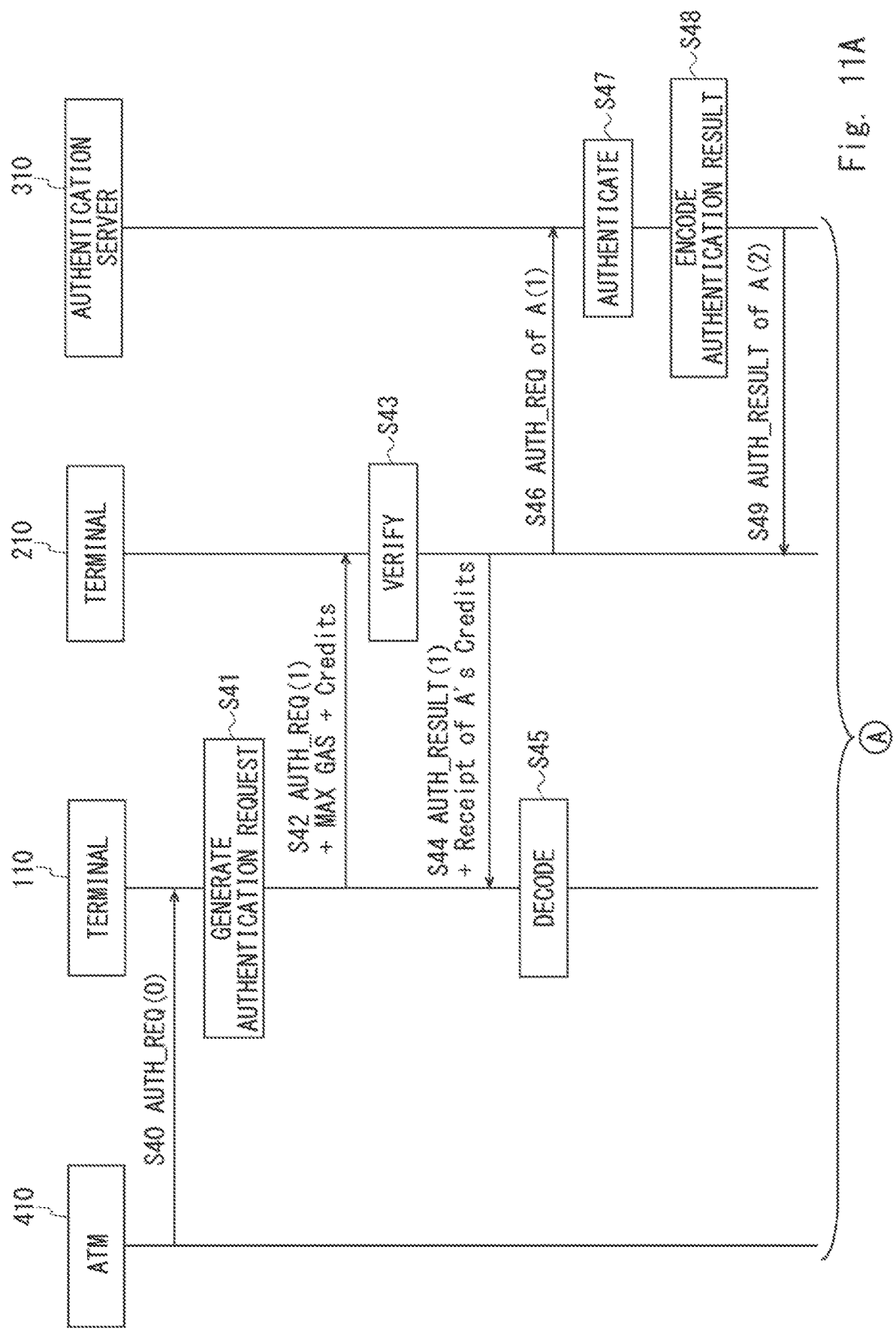
FIG. 11A is a sequence diagram illustrating a processing example of the authentication system according to the present disclosure.
Figure 11B:
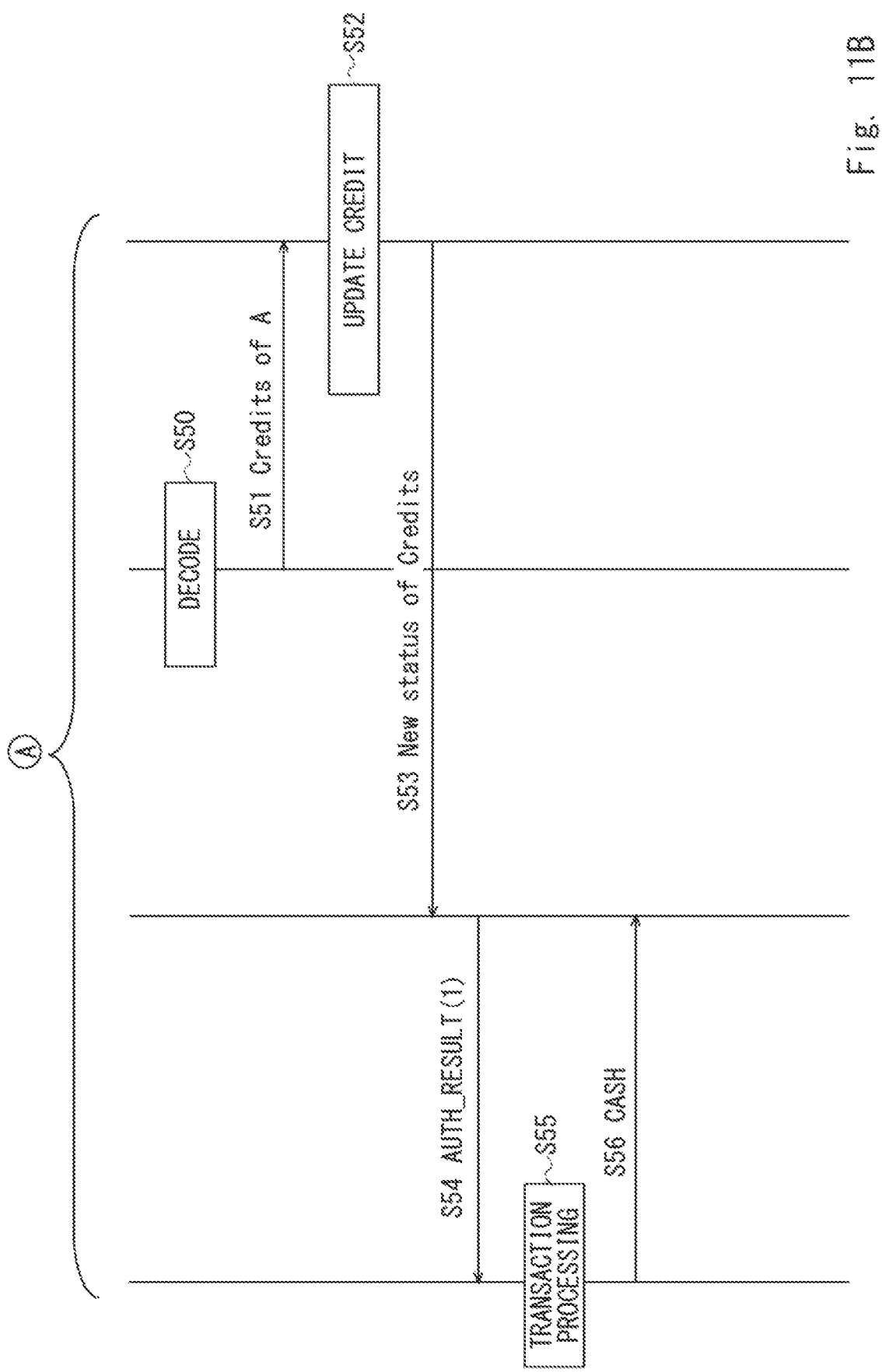
FIG. 11B is a sequence diagram illustrating a processing example of the authentication system according to the present disclosure.

FIGS. 11A and 11B are sequence diagrams illustrating a processing example of the authentication system. Hereinafter, a processing example of the authentication system S2 will be described by using FIGS. 11A and 11B.

First, the user A operates the input unit 413 of the ATM 410, and thus the transaction unit 415 of the ATM 410 starts transaction processing of exchanging cryptocurrency of the user A with cash. Herein, the transaction unit 415 transmits, to the terminal 110 via the short-range wireless communication unit 411, an authentication request AUTH_REQ(0) to request acquisition of an authentication result of the transaction processing (step S40). The short-range wireless communication unit 111 of the terminal 110 receives the authentication request AUTH_REQ(0).

The transaction unit 115 analyzes the received authentication request AUTH_REQ(0). Then, the transaction unit 115 generates an authentication request related to the transaction processing, based on the analysis result. At this time, the transaction unit 115 controls the electronic signature unit 116, and provides, by using the secret key of the terminal 110, an electronic signature to the generated authentication request. Furthermore, the authentication request includes the public key of the terminal 110 as authentication information about the terminal 110. In such a manner, the terminal 110 generates the authentication request AUTH_REQ(1) (step S41).

Herein, the user A recognizes that the authentication server 310 and the moving body communication unit 112 are not connected on the Internet, and the terminal 210 of a user B is present near the user A. Thus, the user A is assisted by the user B in an authentication procedure.

In response to the operation by the user A, the short-range wireless communication unit 111 of the terminal 110 transmits, to the terminal 210 by using WiFi, the authentication request AUTH_REQ(1) generated in step S41 (step S42). Note that, as described above, the plurality of terminals 210 are present. The short-range wireless communication unit 111 can broadcast the authentication request AUTH_REQ(1) for all the terminals 210 to which the short-range wireless communication unit 111 can transmit the authentication request AUTH_REQ(1). However, by specifying the terminal 210 (user B) being a destination by the user A, the short-range wireless communication unit 111 may multicast the authentication request AUTH_REQ(1) for the plurality of specified terminals 210. The plurality of terminals 210 to which the authentication request AUTH_REQ(1) is transmitted in such a manner vary according to a situation, and thus a group of terminals being randomly and locally organized is formed.

At this time, the user A sets a maximum remuneration amount intended to be paid as a price for being assisted by the user B in authentication processing. The remuneration amount can be changed for each piece of the authentication processing. The transaction unit 115 controls the short-range wireless communication unit 111 in such a way that information (GAS information) about the remuneration amount is also transmitted together with the authentication request AUTH_REQ(1) to the terminal 210.

The transaction unit 115 can freely set how remuneration is assigned to the terminal 210 in response to an operation by the user A. In this example, the transaction unit 115 may set remuneration in such a way that the terminal 210 can acquire greater remuneration as time at which the terminal 210 performs authentication processing described below on the authentication request AUTH_REQ(1) is earlier. In other words, a remuneration amount that can be acquired by the terminal 210 is smaller with a longer time that has elapsed since the terminal 110 has transmitted the authentication request AUTH_REQ(1) and information about a remuneration amount until the terminal 210 performs the authentication processing for that. For example, a remuneration amount that can be acquired by the terminal 210 may be set in such a way as to exponentially decrease according to an elapsed time. However, as long as a remuneration amount that can be acquired by the terminal 210 monotonously decreases according to an elapsed time, the remuneration amount may be defined by a rational function and the like of the elapsed time. In the case as described above, theoretically, when an elapsed time is 0, the terminal 210 can acquire a maximum remuneration amount presented by the terminal 110. By setting a remuneration amount in such a manner, the user A can prompt the user B to perform authentication as soon as possible.

Further, the transaction unit 115 may set, according to weight defined for each terminal 210, a probability that each terminal 210 can acquire remuneration in the plurality of terminals 210 to which the authentication request AUTH_REQ(1) is transmitted. The weight is determined by, for example, the amount of remuneration (GAS) stored in the wallet of the storage unit 218 included in each terminal 210. Since a known scheme of Proof-of-Stake can be applied to the scheme, detailed description of a mechanism thereof will be omitted. In the scheme, as a certain user acquires greater remuneration, a reputation of the user increases. Thus, as a reputation of the user B is higher, i.e., defined weight is greater (a remuneration amount that the user already has is higher), a probability that the user B acquires remuneration from the user A in new authentication processing increases when the new authentication processing is performed. Furthermore, ease of receiving remuneration is set based on the amount of remuneration that each of the terminals 210 already has. However, in each piece of the authentication processing, there is no guarantee that a user having a higher reputation reliably receives remuneration. Further, when the terminal 210 acquires remuneration, a remuneration amount that can be acquired by the terminal 210 is determined as described above.

Furthermore, the transaction unit 115 controls the short-range wireless communication unit 111 in such a way that credit information is transmitted together with the authentication request AUTH_REQ(1) to the terminal 210. The credit information is deleted from the wallet of the storage unit 118 when the credit information is transmitted to the terminal 210. In this way, until the authentication processing completely ends and the credit information being security is returned to the terminal 110, the terminal 110 cannot perform new different authentication processing.

The plurality of terminals 210A, 210B, 210C, and . . . acquire the authentication request AUTH_REQ(1), the GAS information, and the credit information by the respective short-range wireless communication units 211. The transaction unit 215 in a certain terminal 210 (herein, it is assumed to be the terminal 210A) analyzes the acquired authentication request AUTH_REQ(1) in response to an operation by the user B. As a result, the transaction unit 215 causes the verification/decoding unit 217 to verify, by using the public key of the terminal 110, the electronic signature provided to the authentication request AUTH_REQ(1) (step S43). In this way, the terminal 210A can confirm that the authentication request AUTH_REQ(1) is generated by the terminal 110. Note that the terminal 210A acquires the public key of the terminal 110 in advance from the authentication server 310, and thus the verification processing can be achieved. As one example, the terminal 210A can acquire the public key of the terminal 110 by acquiring, from the authentication server 310, a list of public keys of terminals being a target on which the authentication processing is performed off-line.

Furthermore, the transaction unit 215 of the terminal 210A may refer to the acquired list of the public keys, and further determine whether the public key of the terminal 110 included in the authentication request AUTH_REQ(1) coincides with the public key disclosed in the list. When both coincide with each other, the transaction unit 215 generates an authentication result AUTH_RESULT(1) described below, but, when both do not coincide with each other, the transaction unit 215 does not generate the authentication result AUTH_RESULT(1). In this way, the terminal 210A can verify reliability of the terminal 110.

After the verification of the electronic signature ends, the transaction unit 215 causes the electronic signature unit 216 to provide an electronic signature to the authentication request AUTH_REQ(1) by using the secret key of the terminal 210A. At this time, in the terminal 210A determined in such a way as to be able to acquire remuneration from the terminal 110, a procedure of receiving at least a part of a remuneration amount presented from the terminal 110 is automatically performed by the wallet of the storage unit 218. Description of a method for assigning remuneration to the terminal 210A and a remuneration amount received by the terminal 210A is as described above. In this way, the authentication result AUTH_RESULT(1) is generated by providing the electronic signature to the authentication request AUTH_REQ(1). Subsequently, the transaction unit 215 of the terminal 210A encodes the authentication result AUTH_RESULT(1) by using the public key of the terminal 110 in such a way that the authentication result AUTH_RESULT(1) cannot be read by a terminal other than the terminal 110 that generates the authentication request AUTH_REQ(1).

Furthermore, the transaction unit 215 provides a time stamp to the authentication result AUTH_RESULT(1). By providing the time stamp, reuse of the authentication result by the terminal 110 in future processing other than the authentication processing this time can be suppressed. The transaction unit 215 of the terminal 210A causes the short-range wireless communication unit 211 to transmit, to the terminal 110, the authentication result AUTH_RESULT(1) being provided with the electronic signature of the terminal 210A, encoded, and provided with the time stamp (step S44). At this time, the transaction unit 215 causes the short-range wireless communication unit 211 to transmit, in a state of being provided with the time stamp, information indicating that the credit information about the terminal 110 has been received.

The short-range wireless communication unit 111 of the terminal 110 receives the authentication result AUTH_RESULT(1). The transaction unit 115 analyzes the authentication result AUTH_RESULT(1). As a result, the transaction unit 115 controls the verification/decoding unit 117, and causes the verification/decoding unit 117 to decode the authentication result AUTH_RESULT(1) by using the secret key of the terminal 110 (step S45). In this way, the transaction unit 115 can confirm that the terminal 210A performs authentication on the terminal 110. Further, the transaction unit 115 causes the verification/decoding unit 117 to verify the electronic signature of the terminal 210A by using the public key of the terminal 210A. In this way, the transaction unit 115 can confirm that the authentication result AUTH_RESULT(1) is transmitted from the terminal 210A. Note that the terminal 110 acquires information about the public key of the terminal 210A in advance from the authentication server 310 by using a method similar to that of the terminal 210A, and thus the verification processing of the electronic signature can be achieved.

After step S44, when the moving body communication unit 212 detects connection with the authentication server 310, the transaction unit 215 transmits the authentication request AUTH_REQ(1) to the authentication server 310 (step S46). The authentication request AUTH_REQ(1) to be transmitted is provided with the electronic signature of the terminal 210A and provided with the time stamp by the method indicated above. Further, the authentication request AUTH_REQ(1) includes the public key (authentication information) of the terminal 110.

The communication unit 311 of the authentication server 310 receives the authentication request AUTH_REQ(1). The authentication unit 312 authenticates the authentication request AUTH_REQ(1), and generates an authentication result AUTH_RESULT(2) of the terminal 110 (user A) (step S47). For example, the authentication unit 312 may generate the authentication result AUTH_RESULT(2) by determining whether the public key of the terminal 110 is revoked on the certificate revocation list by referring to the public key information about the terminal 110 included in the authentication request AUTH_REQ(1) and the certificate revocation list. Therefore, the terminal 210A accesses the authentication server 310, and thus confirms validity of the authentication information about the terminal 210A. However, the terminal 210A may perform the determination processing described above by referring to the public key information about the terminal 110 and the certificate revocation list.

Next, the encoding unit 313 encodes the authentication result by using the public key of the terminal 210A in such a way that the authentication result cannot be read by a terminal other than the terminal 210A to which the authentication result AUTH_RESULT(2) is transmitted (step S48). The communication unit 311 transmits the generated authentication result AUTH_RESULT(2) to the terminal 210A (step S49). The authentication unit 312 transmits a credit information request to request the credit information about the terminal 110 together with the authentication result AUTH_RESULT(2). Further, the stamp provision unit 314 may provide a time stamp to the authentication result to be transmitted.

The moving body communication unit 212 of the terminal 210A receives the authentication result AUTH_RESULT(2) from the authentication server 310. The transaction unit 215 analyzes the received authentication result AUTH_RESULT(2), and determines that the authentication result AUTH_RESULT(2) is an authentication result to the terminal 210A. As a result, the transaction unit 215 controls the verification/decoding unit 217, and causes the verification/decoding unit 217 to decode the authentication result AUTH_RESULT by using the secret key of the terminal 210A (step S50). The transaction unit 215 transmits the credit information about the terminal 110 to the authentication server 310 via the moving body communication unit 212, based on the received credit information request (step S51).

The communication unit 311 of the authentication server 310 receives the credit information from the terminal 210A. The authentication unit 312 updates, based on the previously received authentication request AUTH_REQ(1), the credit information in such a way that the credit information includes, as a history, a content in which the authentication processing is performed on the terminal 110 and the terminal 210A (step S52). When communication with the terminal 110 is connected, the communication unit 311 transmits (returns) the credit information in which a new status is reflected in the updating processing (step S53). The moving body communication unit 112 of the terminal 110 receives the credit information.

The terminal 110 transmits, to the ATM 410, the authentication result AUTH_RESULT(1) being received in step S45 and having verification completed (step S54). The short-range wireless communication unit 411 of the ATM 410 receives the authentication result AUTH_RESULT(1). The transaction unit 415 confirms the authentication result AUTH_RESULT, and then performs transaction processing of exchanging cryptocurrency of the user A with cash (step S55). Then, the short-range wireless communication unit 411 transmits data about the cash being an exchange target to the terminal 110 (step S56). In this way, the authentication processing related to cryptocurrency is performed, and the transaction processing is achieved. Note that the processing in steps S54 to S56 may be performed at any timing after step S45.

In the example indicated above, communication (for example, communication using an advertisement packet) by a method such as Bluetooth instead of WiFi may be performed as short-range wireless communication between the terminal 110 and the terminal 210. In this way, even when terminal-to-terminal communication is not established in advance between the terminal 110 and the terminal 210, the terminal 110 can achieve the authentication processing via the terminal 210 by the short-range wireless communication. Further, communication by a method such as Bluetooth instead of WiFi may be performed as short-range wireless communication between the terminal 110 and the ATM 410.

Further, a QR code technique may be used for provision and acquisition of data between the terminal 110 and the terminal 210. In this case, for example, in step S42, the display unit 113 of the terminal 110 displays the authentication request AUTH_REQ(1), the GAS information, and the credit information as a QR code. The terminal 210 acquires the authentication request AUTH_REQ(1), the GAS information, and the credit information by capturing the QR code by the camera 214. Further, in step S44, the display unit 213 may display the authentication result AUTH_RESULT(1) as a QR code. The terminal 110 acquires the authentication result AUTH_RESULT(1) by capturing the QR code by the camera 114. It is needless to say that the authentication request AUTH_REQ(1) displayed as a QR code may be provided with the electronic signature of the terminal 110, and the authentication result AUTH_RESULT(1) displayed as a QR code may be provided with the electronic signature of the terminal 210 and provided with a time stamp.

Further, a QR code technique may be used for provision and acquisition of data between the terminal 110 and the ATM 410. For example, in step S54, the display unit 113 of the terminal 110 may display, as a QR code, the authentication result AUTH_RESULT(1) provided to the ATM 410. The ATM 410 acquires the authentication result AUTH_RESULT(1) by capturing the QR code by the camera 414. It is needless to say that the authentication result AUTH_RESULT(1) displayed as a QR code may be provided with the electronic signature of the terminal 110.

Further, in a stage of step S50, when the terminal 210A is located near the terminal 110, and the terminal 210A can provide credit information to the terminal 110 by short-range wireless communication or a QR code technique, the terminal 210A may return the credit information to the terminal 110 by using the technique. After the credit information is returned, the terminal 210A can transmit, to the authentication server 310, a report indicating that the credit information is returned.

As indicated above, in the authentication system S2, the terminal 110 can present, to the terminal 210 with which a communication channel has not been established in advance, an authentication request related to cryptocurrency by using short-range wireless communication or a communication technique such as display of data and capturing of the data (for example, a QR code). In this way, even when the terminal 110 cannot be chained to a node communicated via the Internet (even when a block chain cannot be used), the terminal 110 can perform the authentication processing with the terminal 210. Further, when the credit information about the terminal 110 is provided to the terminal 210, and formal authentication is performed in the authentication server 310, the credit information is returned to the terminal 110, and thus a probability that the transaction processing is properly performed can be increased. Furthermore, since mining is not needed in an authentication process, time required for the authentication processing can be shortened.

Further, the terminal 210 can return the credit information to the terminal 110 by transmitting the credit information to the authentication server 310. Further, the terminal 110 can reclaim the credit information in which the authentication processing with the terminal 210 is reflected as a history. Thus, the terminal 110 can perform new authentication processing by using the reclaimed credit information.

Further, the terminal 110 can provide data such as an authentication request to the terminal 210 by the short-range wireless communication unit 111 or the display unit 113, and acquire an authentication result from the terminal 210 by the short-range wireless communication unit 111 or the camera 114. The terminal 210 can also perform processing by a similar interface. Therefore, the terminal can easily perform the authentication processing by using an existing interface. Furthermore, the short-range wireless communication unit 111 can easily provide data such as an authentication request by multicasting or broadcasting the data to the plurality of terminals 210.

Further, data being an authentication target is related to a transaction of cryptocurrency, and the terminal 110 can provide an electronic signature to an authentication result and provide the authentication result to the ATM 410. In this way, the terminal 110 can perform a transaction of cryptocurrency with the ATM 410.

Further, the terminal 110 can further provide, to the terminal 210, information about remuneration being set. Then, when the terminal 210 provides an electronic signature to the authentication request by the electronic signature unit 216, at least a part of the remuneration can be received by the wallet of the terminal 210. In this way, a user of the terminal 210 can acquire the remuneration, and thus assistance by the terminal 210 in the authentication processing can be promoted.

Further, ease of receiving remuneration in the terminal 210 may be set based on the amount of remuneration that each of the terminals 210 already has. In this way, the terminal 210 that has performed a lot of the authentication processing before can more easily receive remuneration, and thus reliability of the authentication processing can be increased.

Further, the amount of remuneration that can be acquired by the terminal 210 may be set in such a way as to decrease according to an elapsed time since a point in time at which the terminal 110 provides information about the remuneration until the terminal 210 authenticates an authentication request. In this way, a user of the terminal 210 can be prompted to perform the authentication processing in an early stage.

Further, the terminal 110 can use the public key of the terminal 110 as authentication information used for the authentication processing. Therefore, the authentication processing can be performed by simple setting.

Further, the terminal 210 can generate an authentication result to the terminal 110 by generating an electronic signature related to an authentication request by using the secret key of the terminal 210. In this way, reliability of the authentication processing can be increased.

Further, the terminal 210 can encode the generated authentication result by using the public key of the terminal 110, also perform processing of providing a time stamp to the authentication result, and provide the authentication result having the processing already performed to the terminal 110. In this way, reliability of the authentication processing can be increased while use of the authentication result by a terminal other than the terminal 110 is suppressed.

Note that the present disclosure is not limited to the example embodiments described above, and may be appropriately modified without departing from the scope of the present disclosure. For example, in the fourth example embodiment, authentication processing in cryptocurrency is described, but a target of the authentication processing is not limited to this.

In the fourth example embodiment, not only a possession amount of remuneration already stored in a wallet but also a possession period of the remuneration stored in the wallet may also be considered when the remuneration in the authentication processing is assigned. For example, a probability of assignment in the remuneration in the authentication processing may be changed according to a value of the possession amount and the possession period of the remuneration. Further, a probability that the remuneration is assigned to a certain terminal in execution of the authentication processing may be set in such a way as to decrease when another authentication processing is performed in the terminal at a time (i.e., a latest time) before, by less than a predetermined threshold value, a time at which the authentication processing is performed. In this way, an overwhelmingly higher or lower probability of acquiring the remuneration for a specific terminal than another terminal can be suppressed.

In the description above, it is described that the device according to this disclosure is formed of hardware, but this disclosure is not limited to this. The device according to this disclosure can also achieve processing (step) of at least any of the terminal, the authentication server, and the ATM described in the example embodiments described above by causing a processor in a computer to execute a computer program.

Figure 12:
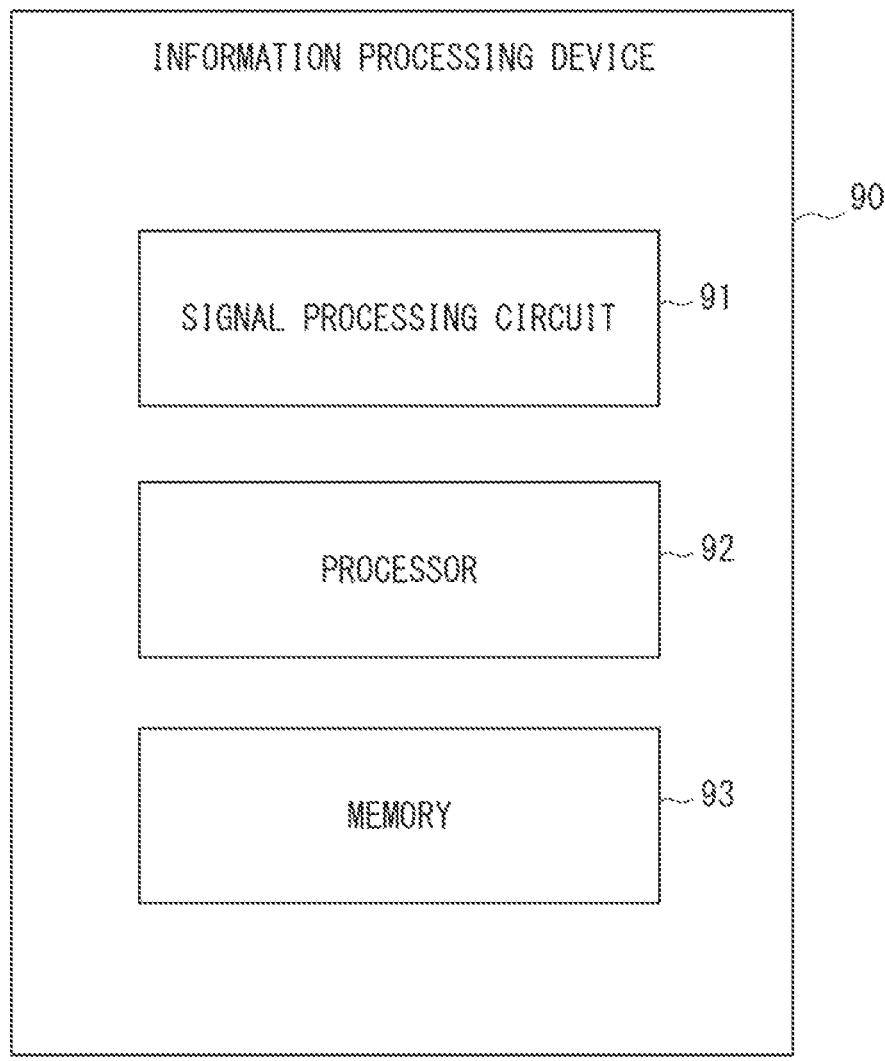
FIG. 12 is a block diagram illustrating a hardware configuration example of an information processing device (signal processing device) in which processing according to the present disclosure is performed.

FIG. 12 is a block diagram illustrating a hardware configuration example of an information processing device (signal processing device) in which the processing according to the present disclosure indicated above is performed. With reference to FIG. 12, the information processing device 90 includes a signal processing circuit 91, a processor 92, and a memory 93.

The signal processing circuit 91 is a circuit for processing a signal according to control of the processor 92. Note that the signal processing circuit 91 may include a communication circuit that receives a signal from a transmission device.

The processor 92 performs the processing of the device described in the example embodiments described above by reading software (computer program) from the memory 93 and executing the software. As one example of the processor 92, one of a central processing unit (CPU), a micro processing unit (MPU), a field-programmable gate array (FPGA), a demand-side platform (DSP), and an application specific integrated circuit (ASIC) may be used, or a plurality of them may be simultaneously used.

The memory 93 is formed of a volatile memory, a non-volatile memory, or a combination thereof. A plurality of the memories 93 may be provided instead of one. Note that the volatile memory may be, for example, a random access memory (RAM) such as a dynamic random access memory (DRAM) and a static random access memory (SRAM). The non-volatile memory may be, for example, a random only memory (ROM) such as a programmable random only memory (PROM) and an erasable programmable read only memory (EPROM), a flash memory, or a solid state drive (SSD).

The memory 93 is used for storing one or more commands. Herein, one or more commands are stored as a software module group in the memory 93. The processor 92 can perform the processing described in the example embodiments described above by reading the software module group from the memory 93 and executing the software module group.

Note that the memory 93 may include a component built in the processor 92 in addition to a component provided outside the processor 92. Further, the memory 93 may include a storage disposed away from a processor forming the processor 92. In this case, the processor 92 can access the memory 93 via an input/output (I/O) interface.

As described above, one or a plurality of processors included in each device in the example embodiments described above execute one or a plurality of programs including a command group for causing a computer to perform an algorithm described by using the drawings. With the processing, the signal processing method described in each of the example embodiments can be achieved.

When the program is read by a computer, the program includes a command group (or software codes) for causing the computer to perform one or more of the functions described in the example embodiments. The program may be stored in a non-transitory computer-readable medium or a tangible storage medium. Examples of the computer-readable medium or the tangible storage medium include a random-access memory (RAM), a read-only memory (ROM), a flash memory, a solid-state drive (SSD), or other memory technique, a CD-ROM, a digital versatile disk (DVD), a Blu-ray (registered trademark) disc, or other optical disc storage, a magnetic cassette, a magnetic tape, a magnetic disc storage, or other magnetic storage device, which are not limited thereto. The program may be transmitted on a transitory computer-readable medium or a communication medium. Examples of the transitory computer-readable medium or the communication medium include electrical, optical, acoustic, or other form of propagation signals, which are not limited thereto.

The whole or part of the exemplary embodiments disclosed above can be described as, but not limited to, the following supplementary notes.

Supplementary Note 1

A terminal including:
a provision unit configured to provide, to another terminal, an authentication request related to data being an authentication target, authentication information about an own terminal, and credit information about the own terminal;
an acquisition unit configured to acquire, from the another terminal, an authentication result of the another terminal for the authentication request; and
a reclaiming unit configured to reclaim the credit information from the another terminal or an authentication server after the another terminal accesses the authentication server and thus validity of the authentication information is authenticated.

Supplementary Note 2

The terminal according to supplementary note 1, wherein the reclaiming unit reclaims the credit information in which authentication processing with the another terminal is reflected as a history.

Supplementary Note 3

The terminal according to supplementary note 1 or 2, wherein
the provision unit is a wireless communication unit configured to perform short-range wireless communication, or a display unit configured to display data being the authentication request, the authentication information, and the credit information, and
the acquisition unit is a wireless communication unit configured to perform short-range wireless communication, or a camera.

Supplementary Note 4

The terminal according to supplementary note 3, wherein the provision unit is the wireless communication unit, and multicasts or broadcasts the authentication request, the authentication information, and the credit information to a plurality of the another terminals.

Supplementary Note 5

The terminal according to any one of supplementary notes 1 to 4, wherein
the data are related to a transaction of cryptocurrency,
the terminal further includes an electronic signature unit configured to generate, by using a secret key of the own terminal, a first electronic signature related to the authentication result, and
the provision unit provides the authentication result and the first electronic signature generated by the electronic signature unit to a transaction device of cryptocurrency.

Supplementary Note 6

The terminal according to any one of supplementary notes 1 to 5, wherein the provision unit further provides, to the another terminal, information about remuneration being set by the own terminal.

Supplementary Note 7

The terminal according to supplementary note 6, wherein the provision unit provides information about the remuneration to the plurality of another terminals, and ease of receiving the remuneration is set based on an amount of remuneration that each of the another terminals already has.

Supplementary Note 8

The terminal according to supplementary note 6 or 7, wherein the remuneration is set in such a way that an amount of the remuneration that can be acquired by the another terminal decreases according to an elapsed time since a point in time at which the provision unit provides information about the remuneration until the another terminal authenticates the authentication request.

Supplementary Note 9

The terminal according to any one of supplementary notes 1 to 8, wherein the authentication information is a public key of the own terminal.

Supplementary Note 10

A terminal including:
an acquisition unit configured to acquire, from another terminal, an authentication request related to data being an authentication target, authentication information about the another terminal, and credit information about the another terminal;
an authentication unit configured to generate an authentication result for the authentication request;
a provision unit configured to provide the authentication result to the another terminal;
a confirmation unit configured to confirm validity of the authentication information by accessing an authentication server; and
a return unit configured to return the credit information to the another terminal when the confirmation unit confirms validity of the authentication information.

Supplementary Note 11

The terminal according to supplementary note 10, wherein the authentication unit generates an electronic signature related to the authentication request by using a secret key of an own terminal, and thus generates the authentication result.

Supplementary Note 12

The terminal according to supplementary note 10 or 11, wherein
the authentication unit encodes, by using a public key of the another terminal, the generated authentication result, and also provides a time stamp related to generation of the authentication result to the authentication result, and
the provision unit provides, to the another terminal, the authentication result being encoded and provided with the time stamp.

Supplementary Note 13

The terminal according to any one of supplementary notes 10 to 12, wherein
the provision unit is a wireless communication unit configured to perform short-range wireless communication, or a display unit configured to display the authentication result, and the acquisition unit is a wireless communication unit configured to perform short-range wireless communication, or a camera.

Supplementary Note 14

The terminal according to any one of supplementary notes 10 to 13, wherein
the acquisition unit further acquires, from the another terminal, information about remuneration being set by the another terminal, and
processing of receiving at least a part of the remuneration by a wallet of the own terminal is performed when the authentication unit generates the authentication result.

Supplementary Note 15

The terminal according to any one of supplementary notes 10 to 14, wherein the return unit returns the credit information to the another terminal via the authentication server.

Supplementary Note 16

An authentication system including:
a first terminal; and
a second terminal, wherein
the first terminal provides, to the second terminal, an authentication request related to data being an authentication target, authentication information about the first terminal, and credit information about the first terminal, and
the second terminal generates an authentication result for the authentication request, provides the authentication result to the first terminal, confirms validity of the authentication information by accessing an authentication server, and returns the credit information to the first terminal when validity of the authentication information is confirmed.

Supplementary Note 17

The authentication system according to supplementary note 16, wherein the second terminal reflects a history of authentication processing with the first terminal in the credit information, and then returns the credit information to the first terminal.

Supplementary Note 18

The authentication system according to supplementary note 16 or 17, wherein
the second terminal acquires the authentication request, the authentication information, and the credit information from the first terminal by any of short-range wireless communication and reading of a code, and
the first terminal acquires the authentication result from the second terminal by any of short-range wireless communication and reading of a code.

Supplementary Note 19

The authentication system according to any one of supplementary notes 16 to 18, wherein the first terminal multicasts or broadcasts, by short-range wireless communication, the authentication request, the authentication information, and the credit information to a plurality of the second terminals.

Supplementary Note 20

The authentication system according to any one of supplementary notes 16 to 19, wherein
the data are related to a transaction of cryptocurrency, and
the first terminal generates, by using a secret key of the first terminal, a first electronic signature related to the authentication result, and provides the authentication result and the first electronic signature to a transaction device of cryptocurrency.

Supplementary Note 21

The authentication system according to any one of supplementary notes 16 to 20, wherein the first terminal sets information about remuneration, and further provides information about the remuneration to the second terminal.

Supplementary Note 22

The authentication system according to supplementary note 21, wherein
the first terminal provides information about the remuneration to the plurality of second terminals, and
ease of receiving the remuneration is set based on an amount of remuneration that each of the second terminals already has.

Supplementary Note 23

The authentication system according to supplementary note 21 or 22, wherein information about the remuneration is set in such a way that an amount of the remuneration that can be acquired by the second terminal decreases according to an elapsed time since a point in time at which the first terminal provides information about the remuneration until the second terminal authenticates the authentication request.

Supplementary Note 24

The authentication system according to any one of supplementary notes 16 to 23, wherein processing of receiving at least a part of the remuneration by a wallet of the second terminal is performed when the second terminal generates the authentication result.

Supplementary Note 25

The authentication system according to any one of supplementary notes 16 to 24, wherein the authentication information is a public key of the first terminal.

Supplementary Note 26

The authentication system according to any one of supplementary notes 16 to 25, wherein the second terminal generates an electronic signature related to the authentication request by using a secret key of the second terminal, and thus generates the authentication result.

Supplementary Note 27

The authentication system according to any one of supplementary notes 16 to 26, wherein the second terminal encodes, by using a public key of the first terminal, the generated authentication result, also provides a time stamp related to generation of the authentication result to the authentication result, and provides, to the first terminal, the authentication result being encoded and provided with the time stamp.

Supplementary Note 28

The authentication system according to any one of supplementary notes 16 to 27, wherein the second terminal returns the credit information to the first terminal via the authentication server.

Supplementary Note 29

An authentication method to be executed by a terminal including:
providing, to another terminal, an authentication request related to data being an authentication target, authentication information about an own terminal, and credit information about the own terminal;
acquiring, from the another terminal, an authentication result of the another terminal for the authentication request; and
reclaiming the credit information from the another terminal or an authentication server after the another terminal accesses the authentication server and thus validity of the authentication information is authenticated.

Supplementary Note 30

An authentication method to be executed by a terminal including:
acquiring, from another terminal, an authentication request related to data being an authentication target, authentication information about the another terminal, and credit information about the another terminal;
generating an authentication result for the authentication request;
providing the authentication result to the another terminal;
confirming validity of the authentication information by accessing an authentication server; and
returning the credit information to the another terminal when validity of the authentication information is confirmed.

Supplementary Note 31

An authentication method to be executed by an authentication system including:
by a first terminal, providing, to a second terminal, an authentication request related to data being an authentication target, authentication information about the first terminal, and credit information about the first terminal; and,
by the second terminal, generating an authentication result for the authentication request, providing the authentication result to the first terminal, confirming validity of the authentication information by accessing an authentication server, and returning the credit information to the first terminal when validity of the authentication information is confirmed.

Supplementary Note 32

A program causing a computer to execute:
providing, to another terminal, an authentication request related to data being an authentication target, authentication information about an own terminal, and credit information about the own terminal;

acquiring, from the another terminal, an authentication result of the another terminal for the authentication request; and reclaiming the credit information from the another terminal or an authentication server after the another terminal accesses the authentication server and thus validity of the authentication information is authenticated.

Supplementary Note 33

A program causing a computer to execute:
acquiring, from another terminal, an authentication request related to data being an authentication target, authentication information about the another terminal, and credit information about the another terminal;
generating an authentication result for the authentication request;
providing the authentication result to the another terminal;
confirming validity of the authentication information by accessing an authentication server; and
returning the credit information to the another terminal when validity of the authentication information is confirmed.

The first, second, third and fourth embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A terminal comprising:
at least one memory configured to store an instruction; and
at least one processor configured to perform the instruction,
wherein the processor performs the instruction, and thus:
provides, to another terminal, an authentication request related to data being an authentication target, authentication information about an own terminal, and credit information about the own terminal;
acquires, from the another terminal, an authentication result of the another terminal for the authentication terminal;
reclaims the credit information from the another terminal or an authentication server after the another terminal accesses the authentication server and thus validity of the authentication information is authenticated;
performs short-range wireless communication or displays data being the authentication request, the authentication information, and the credit information, and thus provides the authentication request, the authentication information, and the credit information to the another terminal;
performs short-range wireless communication or uses a camera, and thus acquires the authentication result from the another terminal; and
provides the authentication request, the authentication information, and the credit information by multicasting or broadcasting the authentication request, the authentication information, and the credit information to a plurality of the another terminals.

2. The terminal according to claim 1, wherein the at least one processor performs the instruction, and thus further reclaims the credit information in which authentication processing with the another terminal is reflected as a history.

3. The terminal according to claim 1, wherein the data are related to a transaction of cryptocurrency, and
wherein the at least one processor performs the instruction, and thus:
further generates, by using a secret key of the own terminal, a first electronic signature related to the authentication result; and
provides the authentication result and the generated first electronic signature to a transaction device of cryptocurrency.

4. The terminal according to claim 1, wherein the at least one processor performs the instruction, and thus further provides, to the another terminal, information about remuneration being set by the own terminal.

5. The terminal according to claim 4, wherein the at least one processor performs the instruction, and thus further provides information about the remuneration to the plurality of another terminals, and
wherein ease of receiving the remuneration is set based on an amount of remuneration that each of the another terminals already has.

6. The terminal according to claim 4, wherein the remuneration is set in such a way that an amount of the remuneration that can be acquired by the another terminal decreases according to an elapsed time since a point in time at which information about the remuneration is provided until the another terminal authenticates the authentication request.

7. The terminal according to claim 1, wherein the authentication information is a public key of the own terminal.

8. A terminal comprising:
at least one memory configured to store an instruction; and
at least one processor configured to perform the instruction,
wherein the processor performs the instruction, and thus:
acquires, from another terminal, an authentication request related to data being an authentication target, authentication information about the another terminal, and credit information about the another terminal;
generates an authentication result for the authentication request;
provides the authentication result to the another terminal;
confirms validity of the authentication information by accessing an authentication server; and
returns the credit information to the another terminal when validity of the authentication information is confirmed, and
wherein the at least one processor returns the credit information to the another terminal via the authentication server.

9. The terminal according to claim 8, wherein the at least one processor generates an electronic signature related to the authentication request by using a secret key of an own terminal, and thus generates the authentication result.

10. The terminal according to claim 8, wherein the at least one processor performs the instruction, and thus:
encodes, by using a public key of the another terminal, the generated authentication result, also provides a time stamp related to generation of the authentication result to the authentication result, and provides, to the another terminal, the authentication result being encoded and provided with the time stamp.

11. The terminal according to claim 8, wherein the at least one processor:
   performs short-range wireless communication or displays the authentication result, and thus provides the authentication result to the another terminal; and
   performs short-range wireless communication or uses a camera, and thus acquires the authentication request, the authentication information, and the credit information from the another terminal.

12. The terminal according to claim 8, wherein the at least one processor performs the instruction, and thus further acquires, from the another terminal, information about remuneration being set by the another terminal, and
   wherein processing of receiving at least a part of the remuneration by a wallet of the own terminal is performed when the at least one processor generates the authentication result.

13. An authentication method to be executed by a terminal, the authentication method including:
   providing, to another terminal, an authentication request related to data being an authentication target, authentication information about an own terminal, and credit information about the own terminal;
   acquiring, from the another terminal, an authentication result of the another terminal for the authentication request;
   reclaiming the credit information from the another terminal or an authentication server after the another terminal accesses the authentication server and thus validity of the authentication information is authenticated;
   performing short-range wireless communication or displaying data being the authentication request, the authentication information, and the credit information, and thus providing the authentication request, the authentication information, and the credit information to the another terminal;
   performing short-range wireless communication or using a camera, and thus acquiring the authentication result from the another terminal; and
   providing the authentication request, the authentication information, and the credit information by multicasting or broadcasting the authentication request, the authentication information, and the credit information to a plurality of the another terminals.

14. The authentication method according to claim 13, further including:
   reclaiming the credit information in which authentication processing with the another terminal is reflected as a history.

15. The authentication method according to claim 13, wherein the data are related to a transaction of cryptocurrency, and the authentication method further includes:
   generating, by using a secret key of the own terminal, a first electronic signature related to the authentication result; and
   providing the authentication result and the generated first electronic signature to a transaction device of cryptocurrency.

* * * * *